United States Patent [19]

Sterling et al.

[11] Patent Number: 4,964,042
[45] Date of Patent: Oct. 16, 1990

[54] STATIC DATAFLOW COMPUTER WITH A PLURALITY OF CONTROL STRUCTURES SIMULTANEOUSLY AND CONTINUOUSLY MONITORING FIRST AND SECOND COMMUNICATION CHANNELS

[75] Inventors: Thomas L. Sterling, Crofton, Md.; Ellery Y. Chan, Melbourne, Fla.

[73] Assignee: Harris Corporation, Melbourne, Fla.

[21] Appl. No.: 231,673

[22] Filed: Aug. 12, 1988

[51] Int. Cl.$^5$ .................. G06F 9/30; G06F 15/82
[52] U.S. Cl. ................ 364/200; 364/228.3; 364/232.22; 364/253; 364/260.2; 364/736
[58] Field of Search ... 364/200 MS File, 900 MS File, 364/736

[56] References Cited

U.S. PATENT DOCUMENTS

| | | | |
|---|---|---|---|
| 4,153,932 | 5/1979 | Dennis et al. | 364/200 |
| 4,379,326 | 4/1983 | Anastas et al. | 364/200 |
| 4,809,159 | 2/1989 | Sowa | 364/200 |
| 4,814,978 | 3/1989 | Dennis | 364/200 |
| 4,841,436 | 6/1989 | Asano et al. | 364/200 |
| 4,893,234 | 1/1990 | Davidson et al. | 364/200 |
| 4,901,274 | 2/1990 | Maejima et al. | 364/900 |

*Primary Examiner*—Thomas C. Lee
*Attorney, Agent, or Firm*—Evenson, Wands, Edwards, Lenahan & McKeown

[57] ABSTRACT

An associative architecture for a static data flow processing system comprises a functional computation unit in which data processing operations are executed, a data processing execution control structure (template) storage and control unit and communication channels through which the functional computation unit and the template storage and control unit communicate with one another. The template storage and control unit controls the supply of data to be processed by the functional computation unit and includes memory for storing a plurality of templates. Each template storage and control unit assembles data processing messages for application to a first of the communication channels for controlling the execution of a data processing operation by the functional computation unit. Each message contains the address of that template to which the result of the data processing operation is returned and stored in a return buffer, an opcode and either the data directly or the address of the template that contains the data to be processed by the functional computation unit. Each template also stores the status of a data processing execution cycle. Each template continuously monitors the communications channels for its address and, upon detecting its address, controllably interfaces prescribed information associated with the execution of a data processing operation with respect to the communication channels.

25 Claims, 22 Drawing Sheets

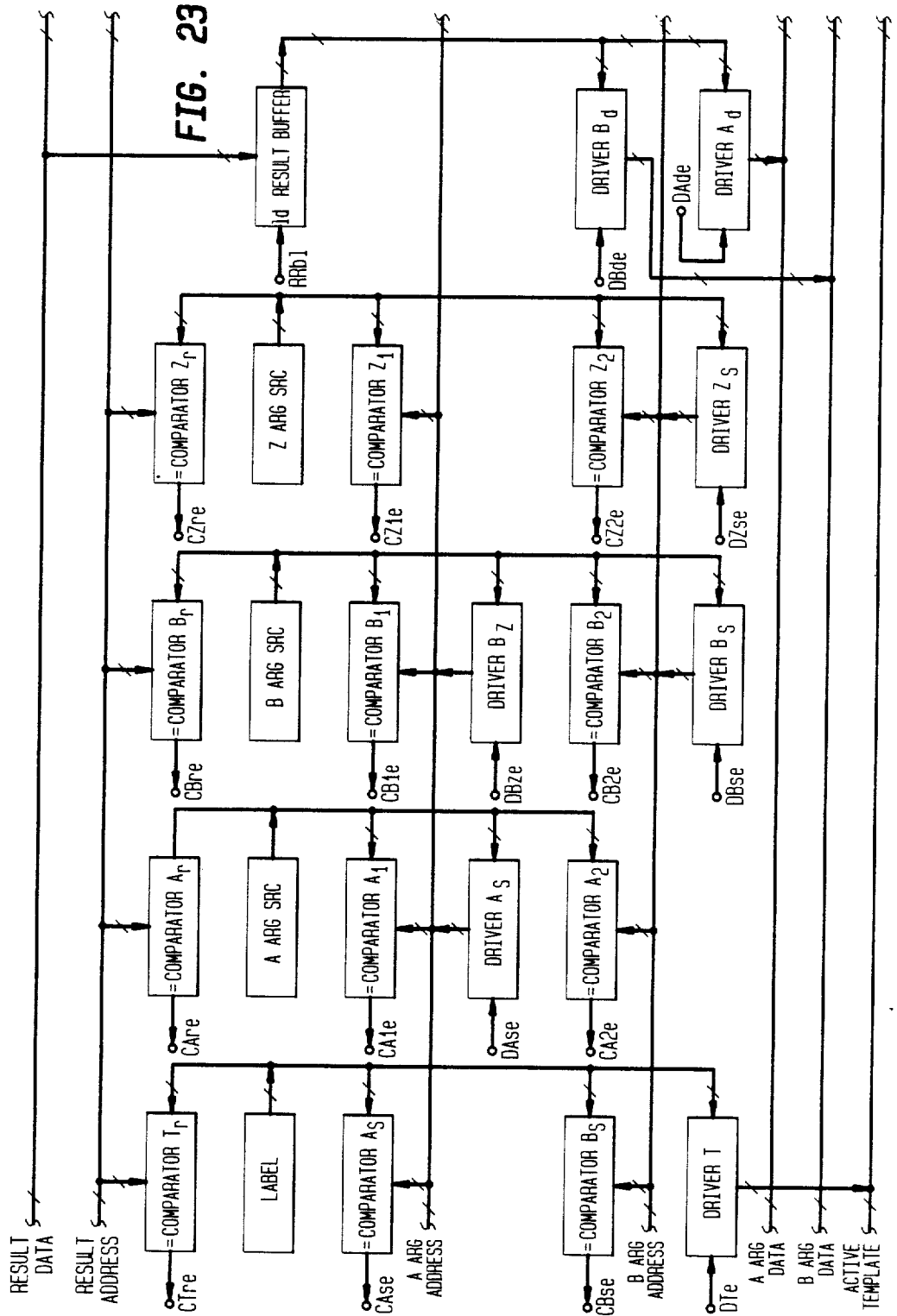

FIG. 25
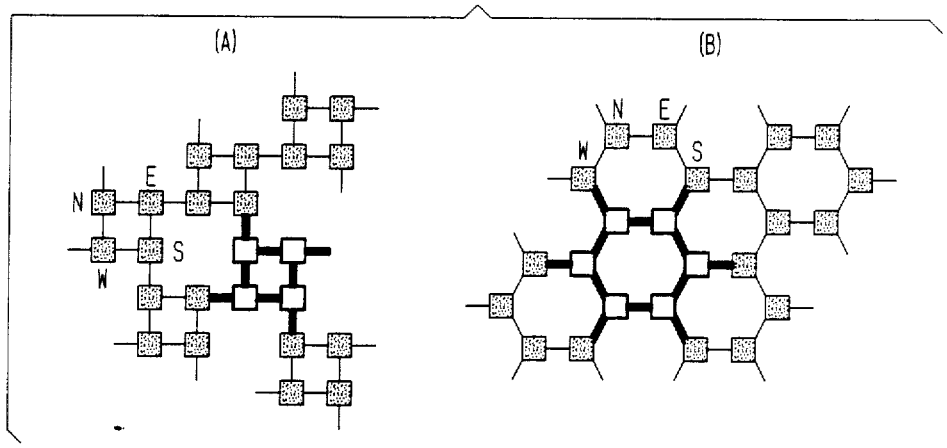
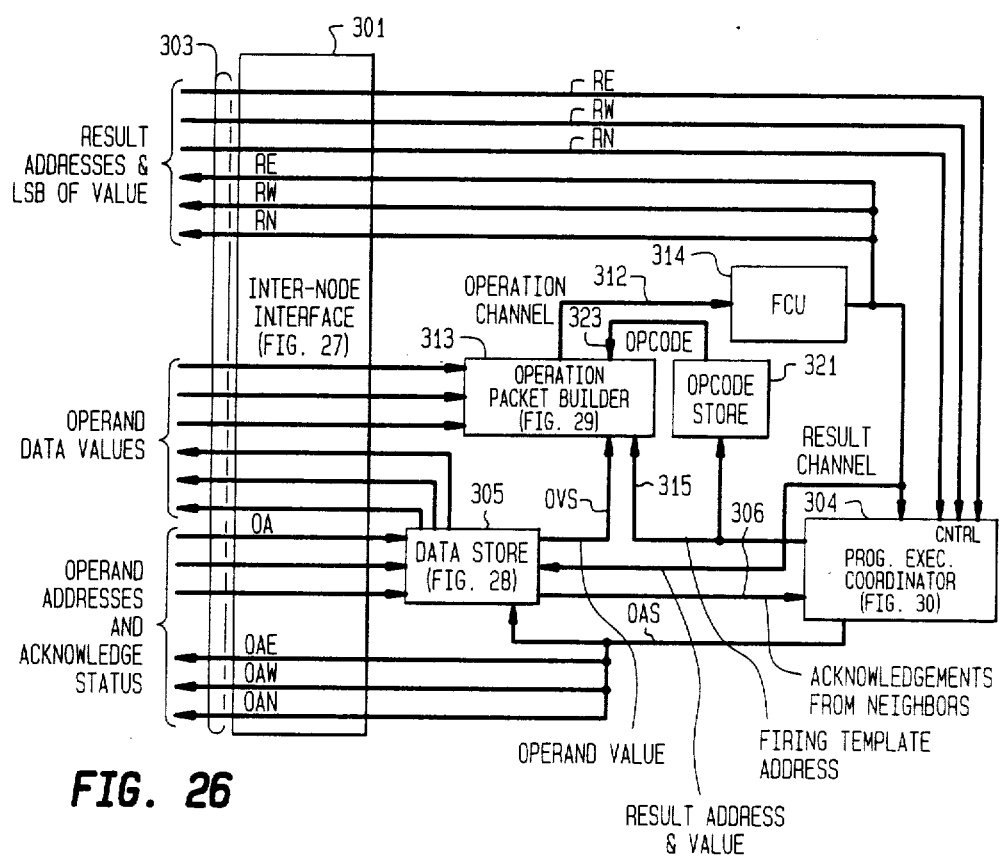
FIG. 26

STATIC DATAFLOW COMPUTER WITH A PLURALITY OF CONTROL STRUCTURES SIMULTANEOUSLY AND CONTINUOUSLY MONITORING FIRST AND SECOND COMMUNICATION CHANNELS

BACKGROUND OF THE INVENTION

The present invention relates in general to data processing systems and is particularly directed to a static dataflow computer architecture communications within which are effected through associative processing.

1. Field of the Invention

In static dataflow computer architectures, program execution is typically controlled by tokens, with directed information packets providing communication and synchronization among data execution control structures, or templates. Unfortunately, the amount of serial, temporal overhead required for a token-based processor to perform a single operation and the number of memory accesses per operation have effectively prevented static data flow computers from being employed for practical parallel data processing.

2. Summary of the Invention

In accordance with the present invention, the substantial temporal overhead and memory bandwidth requirements of token-based static data flow computer architectures are substantially reduced by replacing token-based processor communications with associative processing, similar to that used for associative memories, through which plural data execution control structures, or templates, of the system are interconnected with one another and with the data processing resources of the system, so that they may monitor and respond to operations carried out with respect to all other components of the system simultaneously, thereby increasing data processing execution speed and enhancing the efficient use of system memory.

For this purpose, in accordance with a first embodiment of the present invention involving a single processing node architecture, the static dataflow data processing system includes a functional computation unit, in which data processing operations are controllably executed, a template storage and control unit, and a pair of communication channels through which the functional computation unit and the template storage and control unit communicate with one another. The template storage and control mechanism controls the supply of data to be processed by the functional computation unit and includes memory for storing a plurality of templates. The template storage and control unit assembles data processing messages for application to a first of the communication channels for controlling the execution of a data processing operation by the functional computation unit. Each message contains first information representative of the identification of that template (its address) to which the result of the data processing operation is to be returned (via the second communication channel and stored in a return buffer within that template dedicated for the purpose), second information (an opcode) representative of the data processing operation to be performed by the functional computation unit, and third information representative of the data (either the data directly or the address of the template that contains the data) to be processed by the functional computation unit. Each template also stores the status of a data processing execution cycle. In accordance with the associative architecture of the present invention, each template is coupled to and continuously monitors the first and second communications channels for the presence of its address having been asserted thereon and, in response to detecting the presence of its address, controllably interfacing prescribed information associated with the execution of a data processing operation with respect to the first and second communication channels.

Each template monitors the first communications channel and asserts the contents of its return buffer onto the first communications channel in response to recognizing its address, so that the data stored in the return buffer may be employed as an operand for the execution of a data processing operation by the functional computation unit. In its status entry a template contains acknowledgement information representative of whether any other template requires the use of the contents of the return buffer. The status entry also includes operand availability information indicating whether the result entry of another template, whose address is defined by the contents of a source address entry of that template, contains an operand required for the execution of a data processing operation defined in accordance with opcode entry of that same template.

Each template also contains a code indicating its readiness to "fire", i.e. to have a data processing message asserted onto the first communications channel, in accordance with the contents of the status entry, and includes means for indicating the readiness of the template to have a data processing message asserted on the first communications channel in response to the acknowledgement information being representative that no other template requires the use of the contents of the current result entry of that template as an operand, and that the operand availability information indicates that all operands required for the execution of a data processing operation defined in accordance with opcode are available.

The template storage and control unit includes means for clearing the contents of the acknowledgement and operand availability information within the status entry of the template in the course of causing a data processing message associated with that template to be asserted onto the first communications channel.

The second communications channel includes a data portion over which output data from the functional computation unit is conveyed and a result address portion over which the address of an output data recipient template is conveyed. Each template includes a comparator for comparing its operand source address entries with the contents of the address portion of the second communications channel and controllably causes the operand availability information of the status entry to indicate that an operand entry required for the execution of a data processing operation defined in accordance with an opcode entry of the respective template is available in the result entry of another template whose address matches one of the operand source address entries of the respective template.

The second communications channel also includes a result index portion for identifying one of the operand source entries of a template, and the comparator includes means for causing the operand availability information of the status entry to indicate that an operand entry required for the execution of a data processing operation defined in accordance with an opcode entry of that template is available in the result entry of another template whose address matches the operand source address entry of the respective template as identified by the result index portion.

The first communications channel includes a data portion over which operands are conveyed, an address portion over which the address of a selected template is conveyed, an opcode portion over which the opcode entry of a selected template is conveyed, and an intra template address link over which operand source addresses are conveyable among the templates of said storage unit. Each template includes means for comparing its address with the contents of the intra template address link and causing the contents of its result entry to be asserted onto the data portion of the first communications channel, in response to detecting a match between its address and the contents of the intra template address link.

A respective template includes means for controllably asserting its operand source addresses onto the intra template address link in the course of the assertion of a data processing message, and the second communications channel includes a data portion over which output data is conveyed and a result address portion over which the address of an output data recipient template is conveyed. A template also includes means for controllably causing the operand address asserting means to assert an operand source address onto the intra template address link in accordance with the contents of the address portion of the second communications channel. A selected operand source address is asserted onto the intra template address link in accordance with the contents of a prescribed (least significant bit) portion of the data portion of the second communications channel.

In accordance with a second embodiment of the present invention, the associative template-based data processing mechanism is applied to a larger, system level architecture, comprised of multiple nodes, each having its own dedicated functional computation unit and template storage facility, wherein operand and result data are exchanged among the nodes of the system. The nodes preferably form a mesh topology, in which each node is connected with and may communicate with some number, e.g. three, nearest neighbor nodes with which it shares data resources in the course of execution of its own data processing operations and also in the course of the execution of data processing operations by those neighboring nodes. Namely, within an individual node, a data processing operation defined by a template stored within that node is always executed by the functional computation unit within that node. However, the operands required for and the results of that execution may be shared by templates in nearest neighbor nodes. In order to effect this sharing of data resources, the architecture of each node is configured to provide an inter-node associative communication capability, similar to that of an individual node, for those aspects of a template which may depend upon or be necessary for the execution of a template in any of its neighboring nodes, by assigning associative communication control functions to dedicated storage and supervisory units within each node.

For this purpose, the multi-node configuration of the associative data processing architecture of the present invention comprises a plurality of data processing nodes each of which includes its own dedicated functional computation unit and a program execution control unit which contains a plurality of templates, each template comprising a plurality of entries, including an address for identifying that template, a plurality of operand source entries for specifying the addresses of operands to be employed in the execution of a data processing operation associated with that template, and the status of the template with respect to its associated data processing operation. Each node also contains an opcode store, coupled to the program execution control unit, for storing a plurality of opcodes respectively associated with the plurality of templates, and an opcode which defines a data processing operation to be performed by the functional computation unit. Also included within each node is an operand store, which is coupled to the program execution control unit, for storing a plurality of result entries in which output data produced by the functional computation unit as a result of its execution of a data processing operation requested by a template are stored.

Assembly of a data processing message is carried out by an operation packet builder, which is coupled to the program execution control unit, the opcode store and the operand store. The operation packet builder assembles a plurality of data processing messages to be forwarded to the functional computation unit for execution, a respective data processing message including the identification of a respective template, the contents of respective result entries identified by operand source addresses of said respective template, and the opcode associated with said respective template.

A first communications channel is coupled between the operation packet builder and the functional computation unit for conveying data processing request messages between the packet builder and the functional computation unit. A second communications channel is coupled between the functional computation unit, the program execution control unit, storage unit and the operand store, for conveying output data from the functional computation unit to the operand store and the identification of the template for which a data processing request message has been processed by the functional computation unit to the program execution control unit.

A first internode communication channel is coupled to the second communication channel of each node, for coupling the identification of the template for which a data processing request message has been processed by its associated functional computation unit to the program execution control unit in each node. A second internode communication channel is coupled to the operand store, the operation packet builder, and the program execution control unit of each node, for enabling the operand addresses of a template stored within the program execution control unit of a node to be presented to the operand store of every other adjacent node, and for enabling operand values stored in any node to be presented to the operation packet builder of any node.

The status entry of a respective template includes operand availability information representative of whether the result entry of another template in any neighboring node, whose address is defined by the contents of a source address entry of the template, contains an operand required for the execution of a data processing operation defined in accordance with opcode entry of the template.

The second communications channel includes a data portion over which output data from the functional computation unit is conveyed and a result address portion over which the address of said respective template is conveyed, and the program execution control unit includes a comparator for comparing the operand source entries of the template with the contents of the address portion of the second communications channel and causes the operand availability information of the status entry to indicate that an operand required for the execution of a data processing operation defined in accordance with an opcode associated with the template is available in the operand store of that node which contains the template whose identification matches one of the operand source address entries of the template.

The second communications channel further includes a result index portion for identifying one of the operand entries of a template and the comparator outputs a signal which causes the operand availability information of the status entry to indicate that an operand entry required for the execution of a data processing operation defined in accordance with an opcode entry of the template is available in the operand store of a node containing the template whose address matches the operand source address entry of the template as identified by the result index portion.

BRIEF DESCRIPTION OF THE DRAWINGS

FIGS. 23 and 24 show the overall comparator and driver circuitry and their associated communication buses, together with combined control logic for implementing an associative template;

FIG. 25, illustrates an exemplary mesh topology of a multiple node architecture;

FIG. 26 diagrammatically illustrates the architecture of an individual node of a multi-node processor architecture;

DETAILED DESCRIPTION

Figure 1:
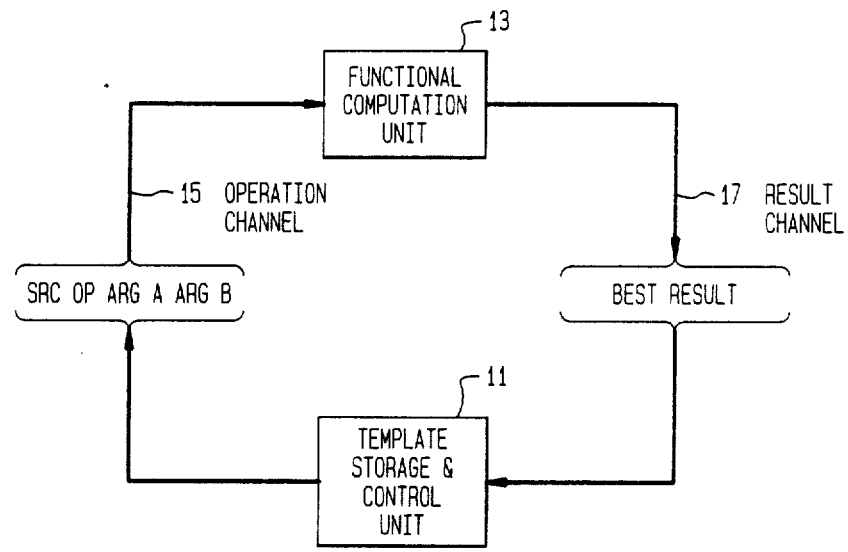
FIG. 1 diagrammatically illustrates the general architecture of an associative template dataflow processing system in accordance with the present invention.

Before describing in detail the particular improved computer architecture in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, the general architecture of a single node associative template dataflow processing system in accordance with the present invention is shown as comprising a pair of operational (storage/control and execution) units 11 and 13 linked with one another by way of a pair of communication paths 15 and 17. By single node architecture is meant that all data processing operations with the system are executed within the confines of a self-contained node or processing unit, as contrasted with a multi-node environment, to be described infra, where multiple execution units have their own computational capabilities and share data resources through an inter-node communications architecture.

Within the single node system of FIG. 1, a data storage and control unit 11 and a functional computation unit 13 are mutually linked by way of an operation channel 15 and a result channel 17. Data storage and control unit 11 contains memory and associated control logic for storing and controllably interfacing a plurality of data processing execution control structures, termed templates, with each of operation channel 15 and result channel 17. A principal responsibility of unit 11 is the control of the presentation or transmission of data processing messages awaiting service in the templates to functional computation unit 13 over operation channel 15. Functional computation unit 15 performs arithmetic and logical operations on one and two argument value sets that are contained within data processing execution messages supplied over operation channel 15 from storage and control unit 11 and forwards the result of its data processing operation over result channel 17 to template storage and control unit 11.

Figure 2:
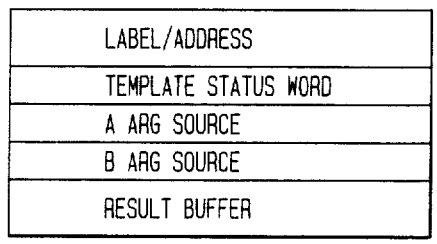
FIG. 2 diagrammatically illustrates the contents of a respective template stored within a storage and control unit of FIG. 1.

The contents of a respective template, stored within template storage and control unit 11, are diagrammatically illustrated in FIG. 2 as a set of table entries comprising: an address, or label, (L) identifying the template and employed by various portions of the system to address that template; a status word (TSW), which contains a number of sub-entries (shown in FIG. 3) representative of the operational/control status of the template; a pair of argument value entries (A arg src and B arg src) corresponding to the labels or addresses of those templates within unit 11 from which the actual argument values of a data processing message are to be obtained; and a result buffer entry in which the result of a data processing operation executed by the functional computation unit is stored.

Figure 3:
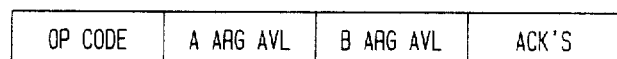
FIG. 3 shows the sub-entries within a template status word.

As shown in FIG. 3, the sub-entries within the template status word comprise an opcode, representative of the data processing operation to be performed, a pair of argument available flags (A arg avl and B arg avl), which indicate whether or not the respective A and B argument values to be employed in the data processing operation are currently resident within the templates whose labels correspond to the A arg src and B arg src entries, referenced above, and a set of acknowledgement flags representative of the status of other templates that use the contents of the result buffer as an argument value. As will be explained in detail below, the contents of the TSW field effectively determine whether or not the entries within the template are complete, so that a data processing message may be assembled and placed on the operation channel to be processed by functional computation unit 13.

Figure 4:
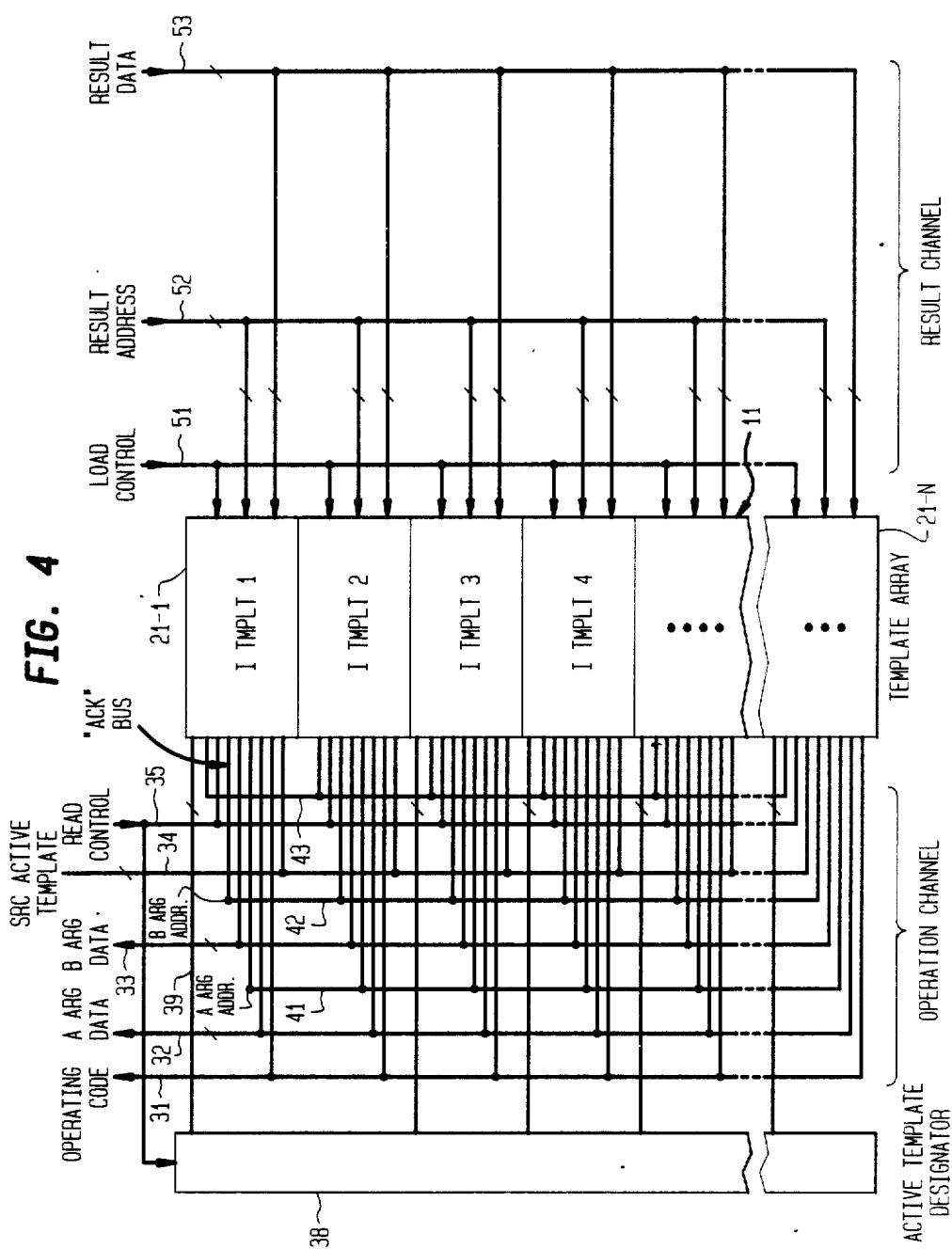
FIG. 4 diagrammatically illustrates the general organization of the system template storage and control unit architecture of FIG. 1.

FIG. 4 diagrammatically illustrates, in greater detail, the general organization of the system architecture of FIG. 1, referenced above. Storage and control unit 11 is shown as being comprised of a plurality or array of N templates, 21-1 . . . 21-N, which are interfaced with functional computation unit 13 through operation channel 15 and result channel 17, each of which is comprised of a multiple bus structure, as shown. Specifically, operation channel 15 contains a set of inter-unit buses including an opcode bus 31, an A argument data bus 32, a B argument data bus 33, an active template bus 34 and a read control bus 35, and a set of intra-unit buses, including an A argument address bus 41, a B argument address bus 42 and an acknowledge bus 43. Opcode bus 31 carries the opcode portion of a data processing message derived from the TSW field of one of templates 21-1 . . . 21-N which is currently invoking the execution of a data processing operation, while buses 32 and 33 carry the A and B argument values obtained from the source templates (A src and B src) specified by the A and B argument source entries of the template. Bus 34 indicates which template is currently active (having a data processing request serviced by functional computation unit 13), and bus 35 is used to provide timing and control signals to manage and synchronize the transmission of messages between template storage and control unit 11 and functional computation unit 13. For this purpose, template storage and control unit 11 includes an arbitration logic circuit, or active template designator 38, which is controlled by the timing signals on bus 35 and controllably designates, via one of links 39-1 . . . 39-N, which template is currently 'active'.

Within the set of intra-unit buses, A argument address bus 41 and B argument address bus 42 are employed by the active template to identify which templates contain the respective A and B argument values (operands) that are to be asserted on A and B argument data buses 32 and 33 during the forwarding of a data processing message to functional computation unit 15. Acknowledge bus 43 serves to propagate control/status information among the templates in the course of establishing whether a template is ready to be asserted.

Result channel 17 is comprised of a load control bus 51, a result address bus 52 and a result data bus 53. Load control bus 51 provides timing signals that direct the monitoring of the address and data buses and the loading of the data by the templates. Result address bus 52 contains the address or label of the template that initiated the data processing operation and to which the result of that operation is to be returned, while data bus 53 contains the actual result data that has produced by functional computation unit 13 and which is to be written into the result buffer of the initiating template.

Figure 5:
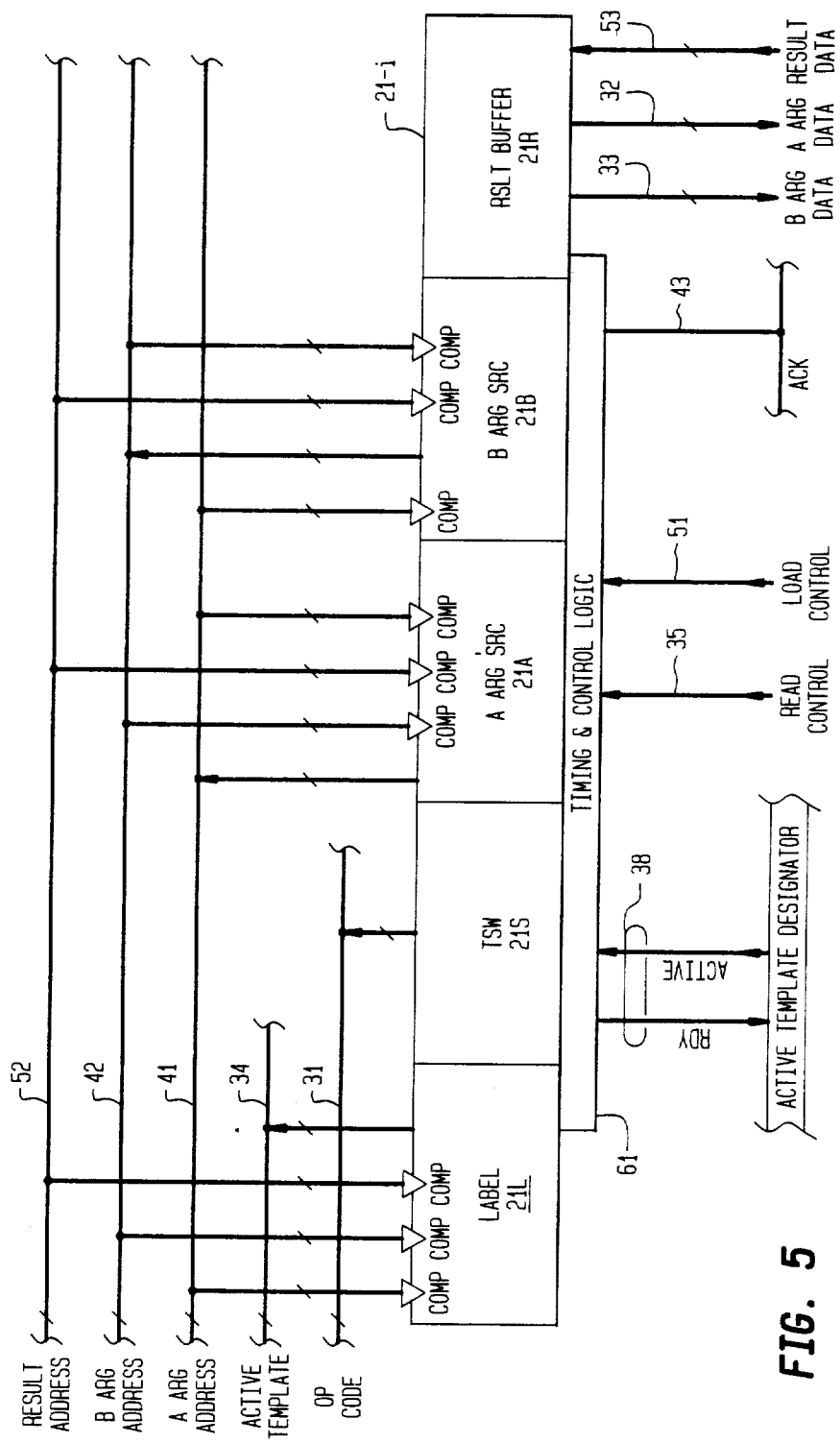
FIG. 5 illustrates the interfacing of the respective bus links of the architecture of FIG. 4 with the respective entries of an individual template within a storage and control unit.

FIG. 5 illustrates, in greater detail, the interfacing of the respective bus links of the architecture of FIG. 4 with the respective entries of an individual template 21-i within storage and control unit 11. Also shown is a timing and control logic circuit 61 that controls the storage and readout of the contents of the respective fields of the template. Within the intra-unit bus portion of operation channel 15, the A and B argument address buses 41 and 42 are coupled as inputs to a template label or address field 21L, so that their contents may be compared with the identity of the template, and thereby determine whether or not the contents of that template's result buffer 21R are to be asserted onto either of A argument or B argument buses 32 and 33, respectively, which are connected as result buffer output links, as shown. A and B argument address buses 41 and 42 are also coupled as inputs to both A argument and B argument source fields 21A and 21B, respectively, so that their contents may be compared with the stored A and B argument source fields for purposes of handling an acknowledgement, as will be described infra. Acknowledgement bus 43 is coupled to timing logic and control logic circuit 61. Under the control of read control bus 35, buses 41 and 42 are also respectively coupled to receive the contents A and B argument source fields 21A and 21B, so that the contents of fields 21A and 21B may be asserted onto the respective A and B argument address buses.

Within the inter-unit portion of operation channel 15, the result address bus 52 is coupled as an input to template label field 21L, so that its contents may be compared with the identity of the template, and thereby determine whether or not the contents of the result data bus 53 are to be written or loaded into that template's result buffer 21R, in accordance with a load control signal supplied to timing and control logic circuit 61 over link 51. Result address bus 52 is further coupled to each of A argument source and B argument source fields 21A and 21B. When either of these argument source fields detects a match between the contents of result address bus 52 and itself, a respective (A or B) 'argument-available' flag within the template status word field is raised, indicating the availability of that argument for use in a message to functional computation unit 13.

Additional bus connections of the inter-unit bus portion of operation channel 15 include the coupling of the opcode portion of the template status word field 21S to opcode bus 31 and the coupling of the template address to active template bus 34. Timing and control logic circuit 61 also monitors the contents of template status word field 21S to control the generation of a 'ready' control signal on link 39R to active template designator 38 which, in turn, asserts an 'active' control signal on link 39A to inform timing and control logic circuit 61 when that template has become the current or active data structure.

To facilitate an understanding of the associative operation of the architecture of the single node embodiment of the present invention, in the description to follow, the manner in which a template monitors and responds to the contents of the respective bus portions of result and operation channels 15 and 17 will be explained in detail with reference to FIGS. 6–24, which diagrammatically illustrate the state and functionality of the stored contents of a template in the course of its interaction with the contents of one or more prescribed portions of one of the communication channels.

Figure 6:
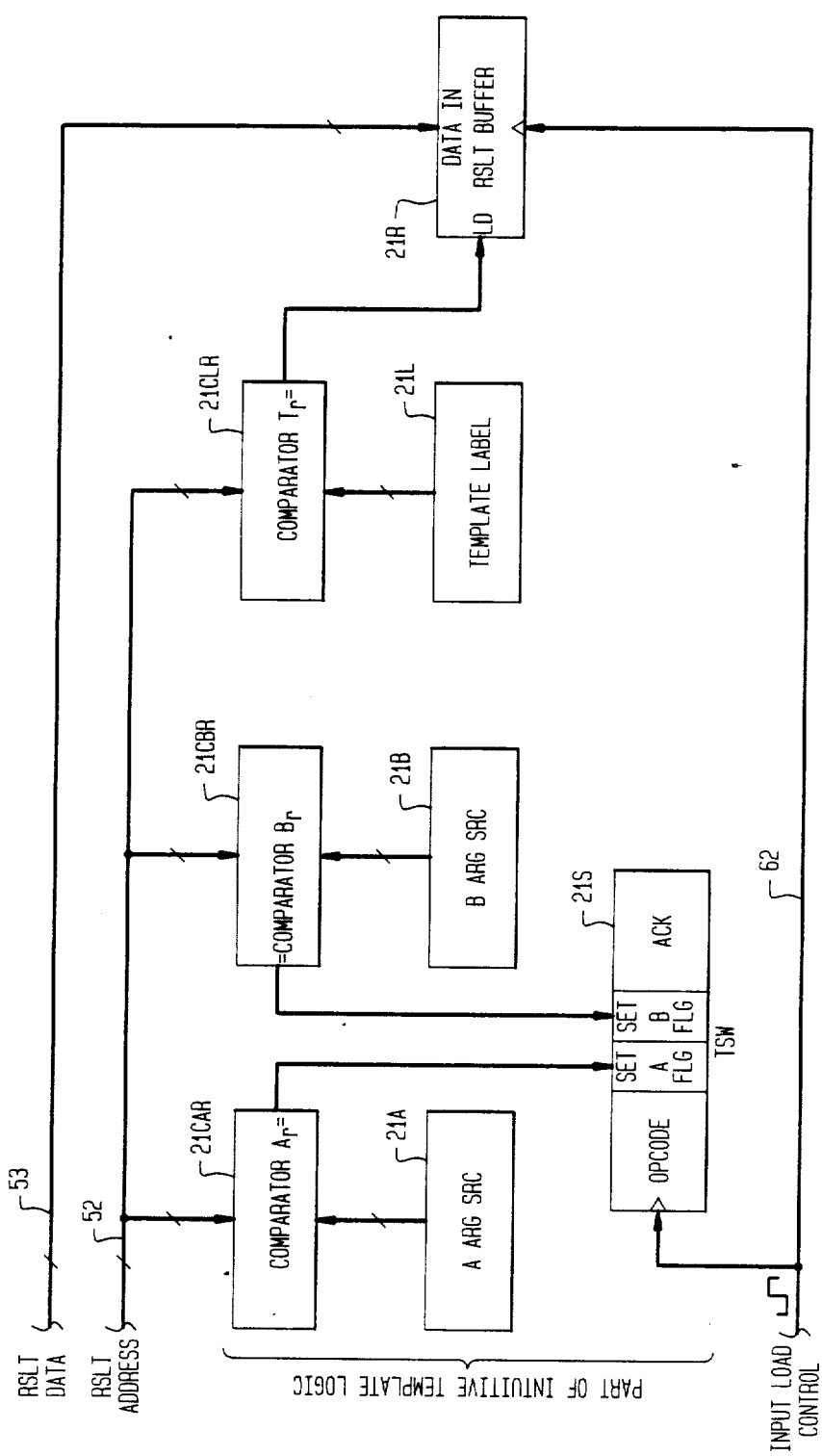
FIG. 6 shows circuitry within a template for handling result data and address signals.

Result Handling (FIG. 6)

As shown in FIG. 6, result address bus 52 is coupled to each of respective comparators 21CAR, 21CBR and 21CLR wherein its contents are compared with A argument address field 21A, B argument address field 21B and the template address 21L. If the result address matches either of the argument address fields a respective A or B flag is set within the template status word field 21S. If the result address matches the template's address, comparator 21CLR supplies a load input to result buffer 21R causing the contents of result data bus 53 to be written into result buffer 21R. The loading operation of each of the template status word field 21S and result buffer 21R is controlled by a clock control signal from timing and control logic circuit 61 on link 62, which synchronizes the loading operation with the operation of functional computation unit 13.

There are two situations in which a template may respond to the contents of result address bus 52. As pointed out previously, when functional computation unit 13 completes the execution of a data processing operation, the contents of result address bus 52 identify the template which initiated the data processing operation that produced the output data on result data bus 53. In this circumstance, comparator 21CLR detects a match between the template label 21L and the contents of result address bus 52, so that result buffer 21R is loaded with the result data.

The other situation involves the use of a result value by a template as one of its operands. In this case the template does not store the argument value itself, since it is already being saved by the template that initiated its production. However, it is necessary to store an indication that the argument value is now available (in another template). For this purpose, the template employs comparators 21CAR and 21CBR to determine whether or not the result address matches either or both of its A and B argument source fields. If a match occurs, in either case, a respective flag bit is set in the corresponding A/B availability field within the template status word field 21S, thereby indicating that the A/B argument is resident in the template whose label corresponds to the argument source address. All templates which employ the result data as an operand will set their corresponding flag bit(s) simultaneously.

Figure 7:
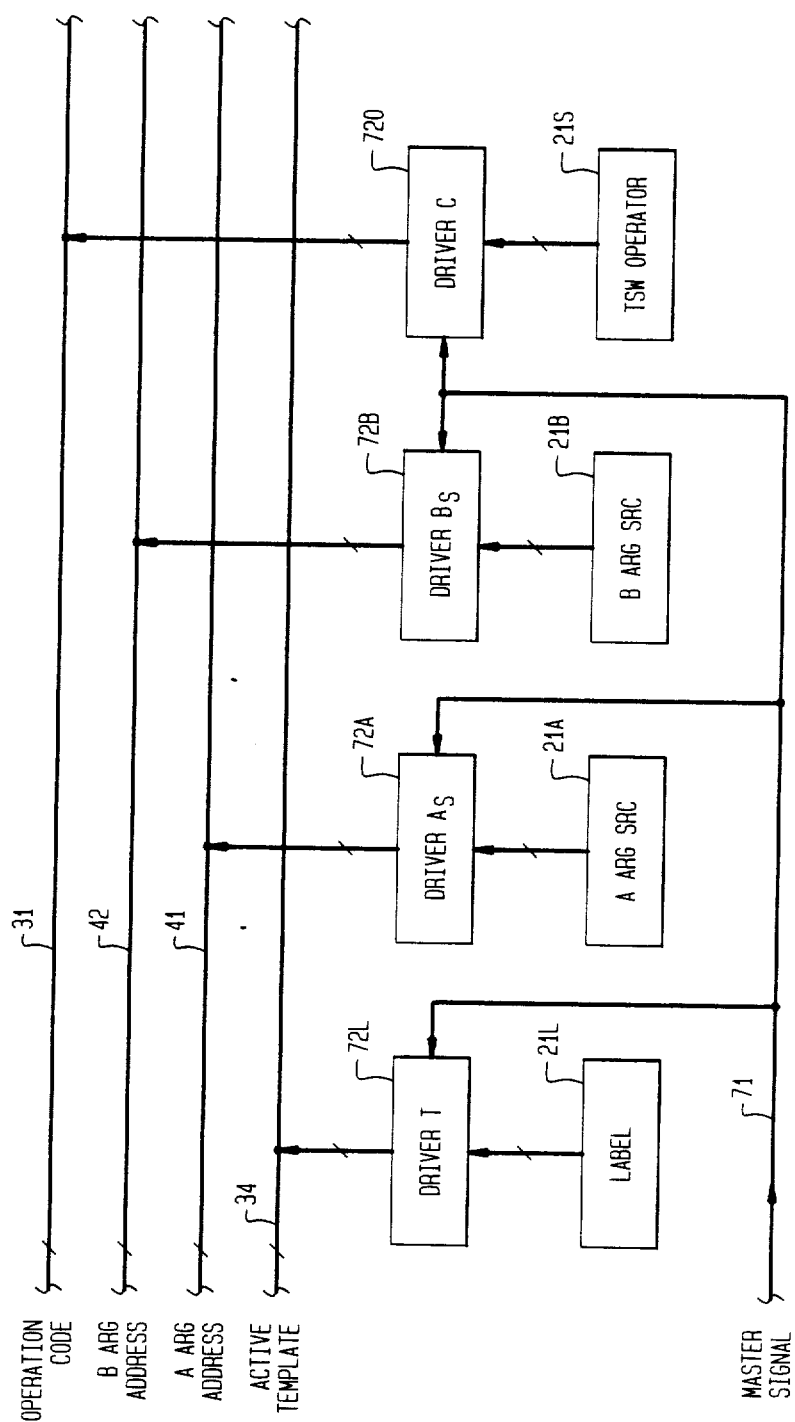
FIG. 7 diagrammatically illustrates the operation of a 'master' template.
Figure 8:
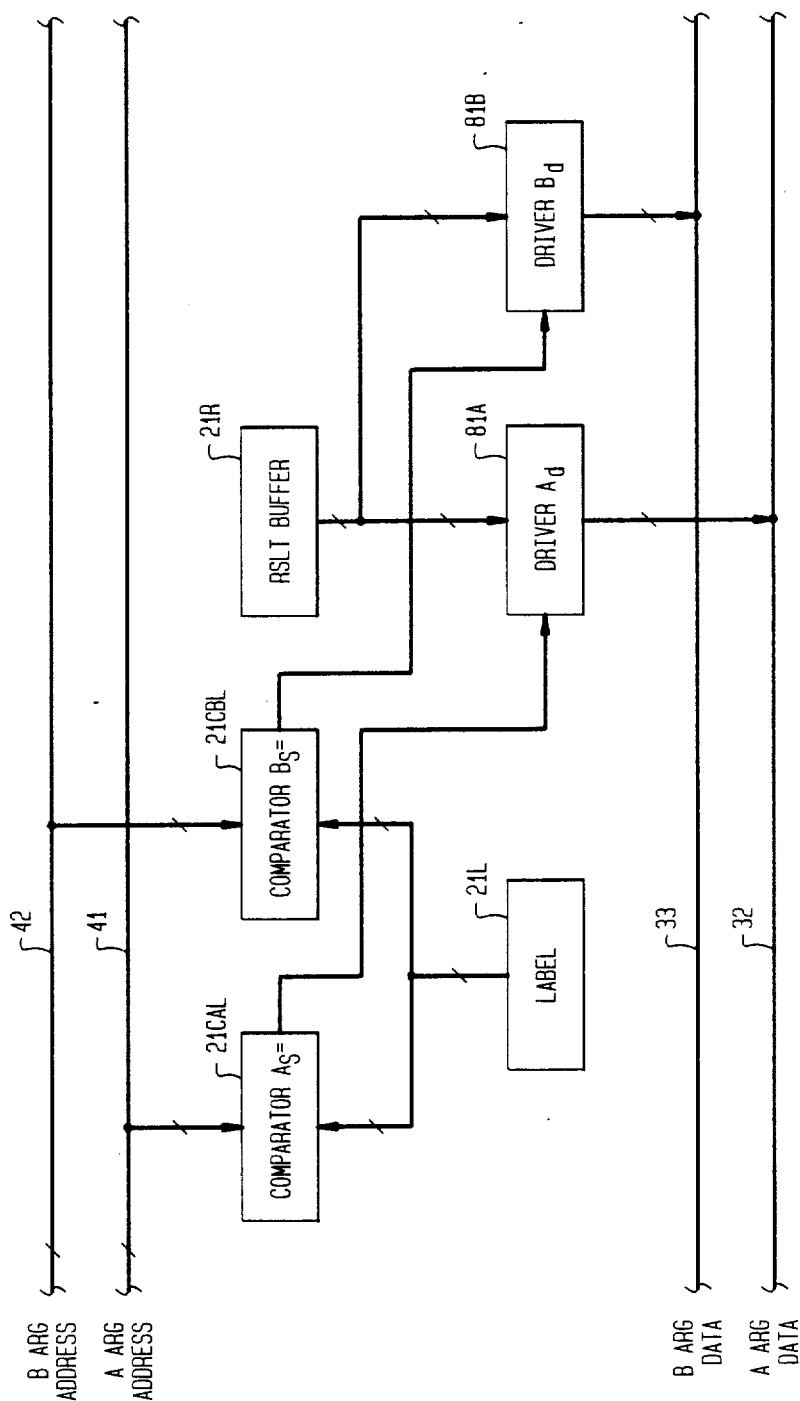
FIG. 8 diagrammatically illustrates the operation of an operand-supplying template.

Assertion of Data Processing Message (FIGS. 7 and 8)

During each cycle of operation of channel 15, two types of templates are involved—a master template (which initiates the assertion of a data processing message), and one or more operand templates (which provide the actual argument values).

In response to a message assert request from functional computation unit 13 on read control bus 35, active template designator 38 asserts an 'active' control signal on bus 39A to a 'master' template (the operation of which is diagrammatically shown in FIG. 7), which is ready to transmit a message and which the arbitration logic within designator 38 has determined to be next in line for service. This active control signal causes control logic 61 to assert a master template control signal on link 71, which is coupled to the enable inputs of each of respective output drivers 72L, 72A, 72B and 72O that are associated with the respective template address, A and B argument source and opcode portion of the template status word fields. Template address driver 72L is coupled to active template bus 34, drivers 72A and 72B are coupled to address buses 41 and 42, and opcode driver 72O is coupled to bus 31. As a consequence, the source and opcode portions of the operation channel are specified immediately by the contents of label field 21L and the opcode portion of the template status word field that are asserted onto the inter-unit buses of operation channel 15, while the addresses of the A and B arguments to be asserted on the A and B argument data buses of the inter-unit bus portion of operation channel 15 are asserted onto buses 41 and 42, respectively. Since buses 41 and 42 are contained within the intra-unit portion of operation channel 15, their contents are not applied directly to functional computation unit 13. Instead, they are used to select the templates in which the actual operand values are stored.

The operation of an operand-supplying template is diagrammatically illustrated in FIG. 8. As shown therein, A and B argument address buses 41 and 42 are respectively coupled to first input ports of comparators 21 CAL and 21CBL, second input ports of which are coupled to template address field 21L. Should the contents of either of buses 41 and 42 match the template address, a corresponding one or both of drivers 81A and 81B will be enabled, so as to cause the contents of result buffer 21R, which is the actual operand value to be employed in the execution of the data processing operation, to be asserted on the associated A and B argument data bus 32 and 33 of the inter-unit bus portion of the operation channel 15. It should be noted that the configuration shown in FIG. 8 will support the situation where a single template is requested to supply both the A and B arguments (as in the case of a multiply operation to compute the square of a number).

Acknowledgements

As pointed out supra, in the course of the generation of a data processing message by a master template, the operands are derived from the result buffers in one or more other templates. The contents of these other templates depend upon the contents of a previous template in terms of program flow. It often occurs that a template may be used repeatedly and, in the case of pipelined processing, continuously. It is necessary, therefore, to preserve the order of message assertion of a sequence of templates, so that no template can perform a new operation until all of its dependent templates, that require the use of a previously computed value stored in its result buffer as an operand, have performed their operations. Preserving the order of message assertion is accomplished in accordance with the present invention through the use of an acknowledgement mechanism which is incorporated into the template and which is examined before execution of the template may proceed. The discussion to follow will address two types of acknowledgement mechanisms, one using a counter to keep track of the number of dependent templates that have yet to be asserted before the template may become active, and a distributed mechanism through which a template determines the status of all of its dependent templates whenever its own result buffer is referenced by another template.

Counter-Defined Acknowledgement

Figure 9:
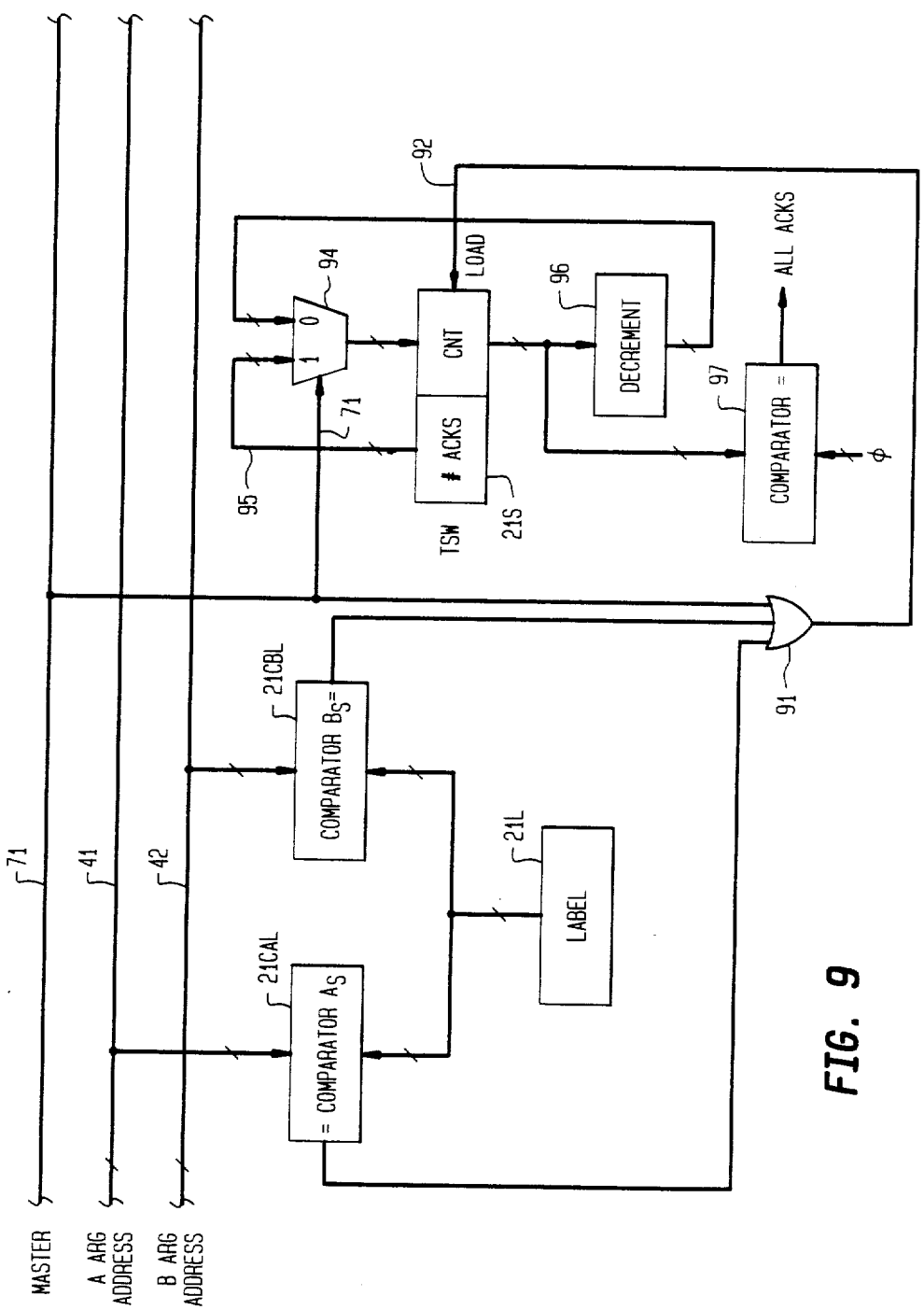
FIG. 9 illustrates a circuit for modifying the template status word field through the use of a counter to track the number of dependent templates, remaining to be asserted.

FIG. 9 illustrates the manner in which the template status word field 21S is modified through the use of a counter used to track the number of dependent templates remaining to be asserted. Specifically, a first additional static sub-field, identified as #Acks, is used to indicate the number of dependent templates, while a variable Cnt sub-field is used to indicate the number of templates remaining to be asserted before the template may reexecute. The contents of the Cnt sub-field are coupled to a down counter or decrement circuit 96, the output of which is coupled to one input of a multiplexer 94. The output of multiplexer 94 is coupled to the count sub-field. A second input of multiplexer 94 is coupled to receive the contents of the #Ack sub-field of the template status word 21S. The output of the Cnt sub-field is also coupled to a zero reference comparator 97, to determine when the contents of the Cnt sub-field have been decremented to zero.

In operation, when the template has been designated as the master template and asserts a data processing message on operation channel 15, the contents of the Cnt sub-field is reset to the value of the #Ack sub-field. If the master control signal is asserted on link 71, multiplexer 94 couples the #Acks subfield to the Cnt sub-field and an active load signal is coupled from OR gate 91 to the load input of the register in which the Cnt sub-field is resident. Otherwise, multiplexer 94 selects the decrement output to reduce the value in the Cnt sub-field. Whenever the result buffer is accessed by a master template, one of comparators 21CAL and 21CBL will supply an output through OR gate 91 to cause a load signal to be applied to the Cnt subfield. Because the master active control signal is not asserted at this time, multiplexer 94 couples the decremented count value to the Cnt sub-field. As a consequence, the contents of the Cnt sub-field are decremented every time the template's result buffer is accessed. This process continues until comparator 97 detects that the count value has reached zero, at which time it produces an output indicating the all dependent templates have been asserted.

Distributed Acknowledgement

Figure 10:
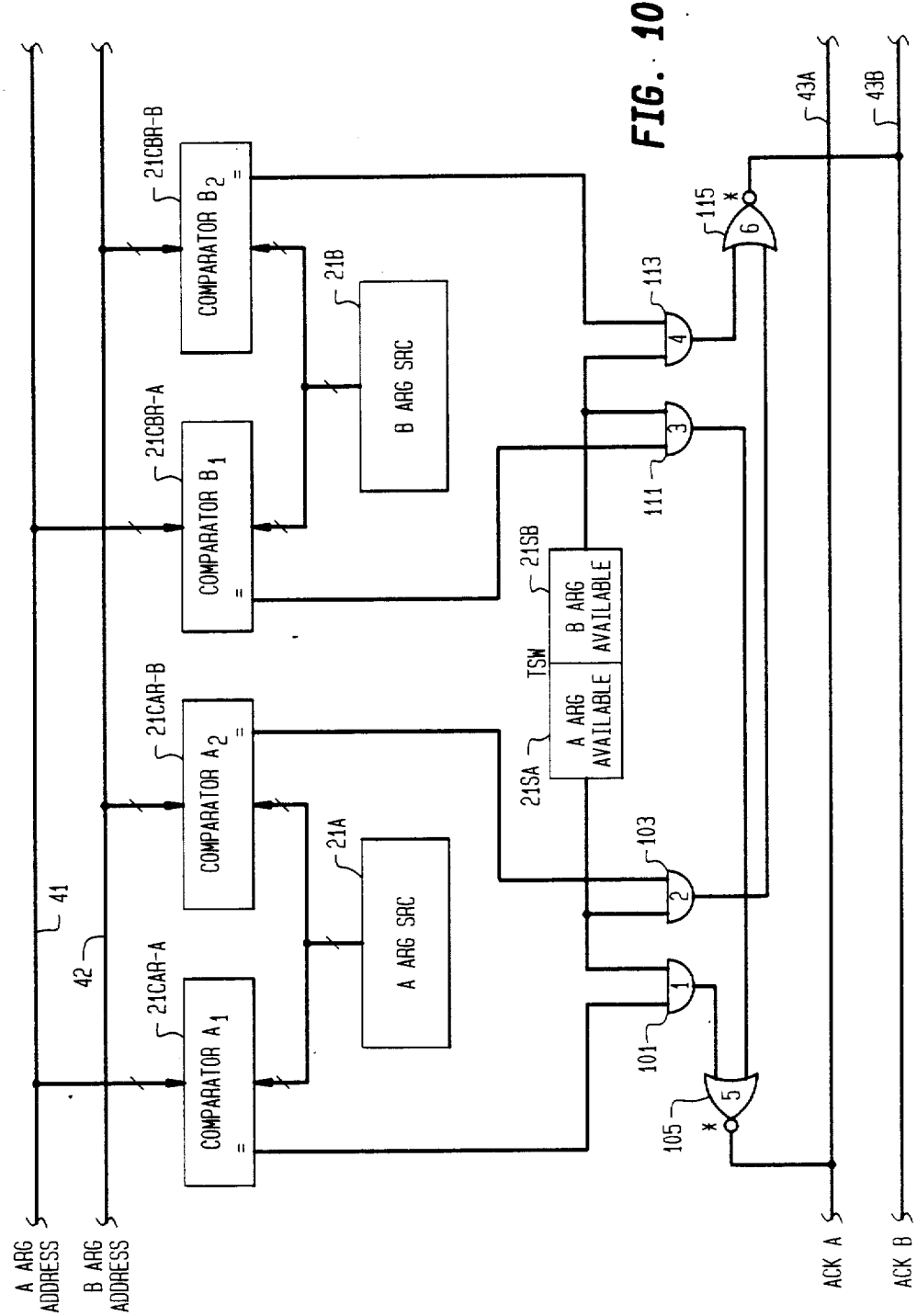
FIGS. 10 and 11 diagrammatically illustrate a mechanism for generating an acknowledgement through the use of a dual argument acknowledgement bus and status word field.
Figure 11:
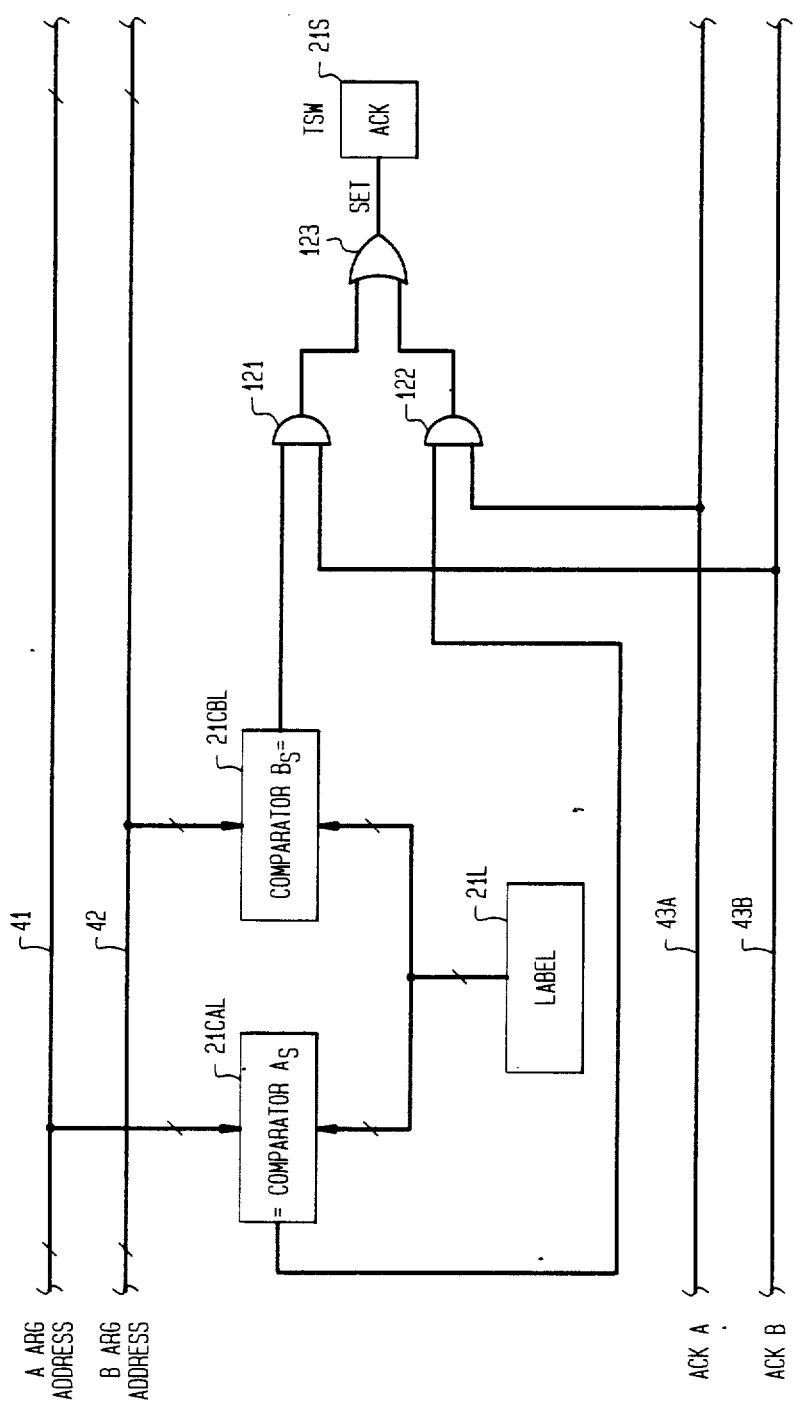

FIGS. 10 and 11 diagrammatically illustrate a mechanism for generating an acknowledgement through the use of a dual argument acknowledgement bus and status word field. FIG. 10 illustrates comparator and logic circuitry by which a dependent template provides an indication of whether or not it has been asserted; FIG. 11 depicts comparator and logic circuitry for determining if all dependent templates have been asserted.

As shown in FIG. 10, A and B argument address buses 41 and 42 are respectively coupled to pairs of dual comparators 21CAR-A, 21CBR-A and 21CAR-B, 21CBR-B. Comparators 21CAR-A and 21CAR-B are coupled to compare the contents of each of the argument address buses 41 and 42 with the A argument source field 21A, while comparators 21CBR-A and 21CBR-B are coupled to compare the contents of each of the argument address buses 41 and 42 with the B argument source field 21B. If any of the comparators detects a match between its monitored argument address and the stored source address field (representative of earlier asserted templates), then the template is required to indicate status information on the appropriate acknowledgement line 43A, 43B. Acknowledgement link 43A is used in the case of an earlier-asserted template being referenced by a current master template on A Arg address bus 41, while acknowledgement link 43B is used in the case of an earlier-asserted template being referenced by a current master template on B Arg address bus 42.

The template is considered pending with respect to an earlier-asserted template if it has not been asserted since the prior template's most recent result value became available, which is determined by reference to the state of the A argument available and B argument available flags in the template status word sub-fields 21SA,21SB. If the A argument available flag is set when the prior template referenced by the contents of the A argument source field 21A is detected, then one of AND gates 101 and 102 will be enabled, causing an active (low) signal to be asserted via one of NOR gates on either (open collector) Ack A line 43A or Ack B line 43B. Similarly, if the B argument available flag is set when the prior template referenced by the contents of the B argument source field 21B is detected, then one of AND gates 111 and 112 will be enabled, causing an active signal to be asserted.

Referring now to FIG. 11, which shows the mechanism for determining whether all dependent templates have been asserted, acknowledgement bus portions 43A and 43B are coupled to one input of respective AND gates 212 and 122, second inputs to which are coupled to the outputs of comparators 21CAL and 21CBL, described previously with reference to FIG. 8. Whenever the result buffer is referenced by argument address signals on argument address bus lines 41 or 42, its corresponding comparator 21CAL, 21CBL will detect a match between the referenced template's address and the argument address, thereby providing an enabling input to one of AND gates 121 and 122. If either of comparators 21CAL, 21CBL detects a match, then it is known that the dependent templates are providing assertion status information on the acknowledgement lines 43A or 43B. An active acknowledgement line indicates that there are still pending dependent templates to be asserted. When the relevant acknowledgement line goes high (inactive) at the time the associated comparator 21CAL, 21CBL has detected a match, then it can be inferred that all dependent templates have been executed, so that the referenced template may execute (subject, of course to the availability of its own operand values). Upon this condition being satisfied, the output of OR gate 123 sets the acknowledgement flag within the status word field 21S. This flag will be reset upon execution of the template.

Figure 12:
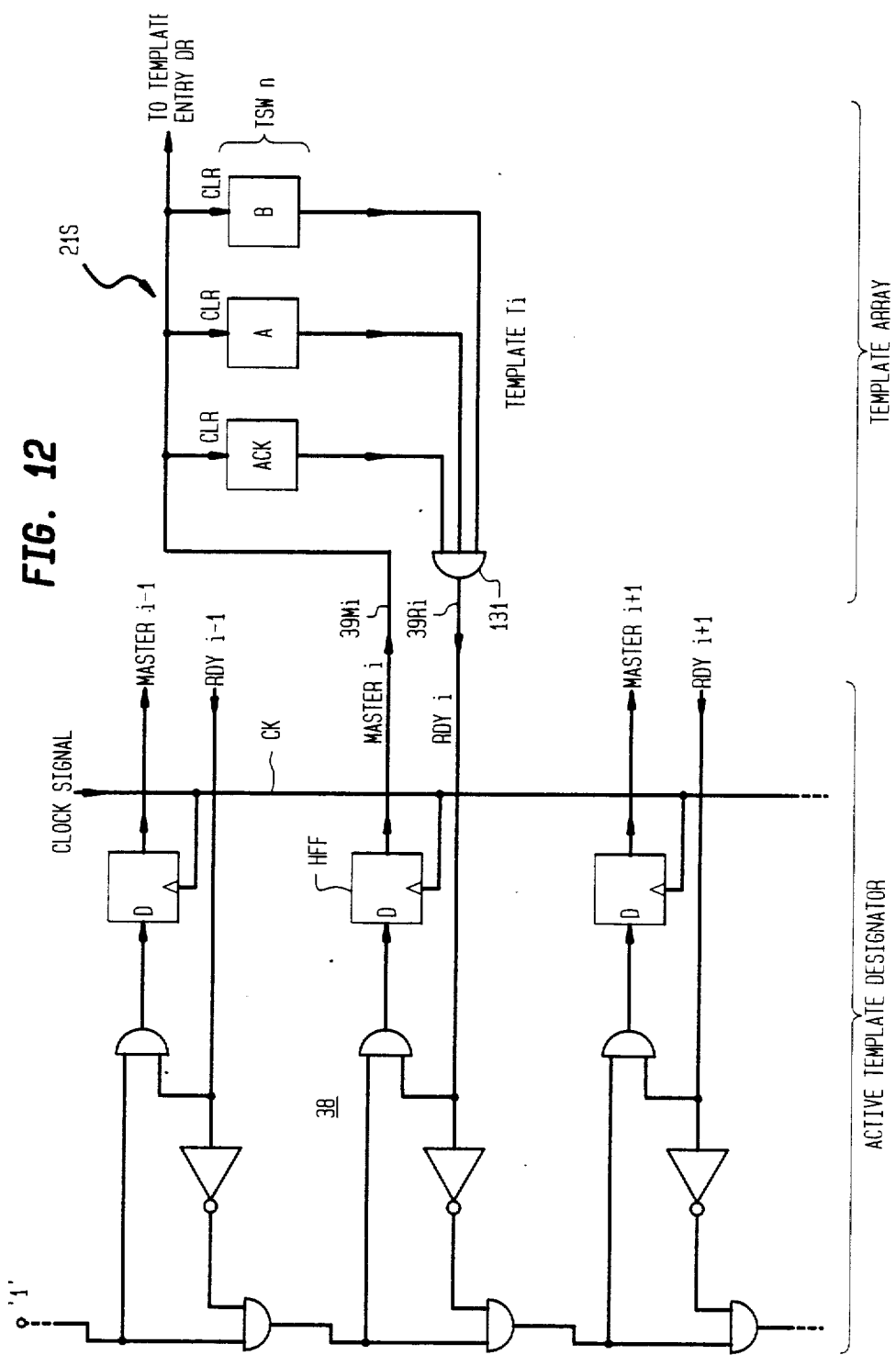
FIG. 12 shows the configuration of a designator circuit for detecting whether a template is ready to be asserted and for selecting which ready template is the next in line to be asserted.

As pointed out previously, the order of assertion (becoming master/execution) of a template onto the operation channel is dependent upon the template being ready and not requiring execution of any other template, and it must be selected for assertion by the active template designator. FIG. 12 shows the configuration of such a designator circuit for detecting whether a template is ready to be asserted and for selecting which ready template is the next in line to be asserted.

For this purpose the active template designator comprises a daisy-chain arbitration logic circuit 38 which monitors the acknowledgement and A and B availability flags within the status word field via an AND gate 131, the output of which is asserted active (RDY) if all three flags are set. This RDY signal is coupled to a respective stage of a conventional linked AND gate daisy chain arbitration circuit 38. A constant active signal level is asserted at the input to the first (top, as viewed in FIG. 12) stage and is controllably propagated down the chain in dependence upon the assertion of the respective RDY signals from the template status word fields. For a template Ti, if RDY is asserted and there are no higher priority (up the chain) templates waiting to be asserted, then a hold flip-flop HFF is set by a clock signal CK, causing a MASTER i signal to become active, indicating that template Ti is the new master template. In response to this MASTER i signal, the template enables the appropriate output drivers and resets the status word flags.

In the foregoing description it has been assumed that template arguments are generated by the execution of other templates. However, it is occasionally necessary to specify the value of an argument as a constant, namely, an immediate argument. To successfully support an immediate argument, the entries in the template's Argument Source fields 21A and 21B must be capable of storing and using both template addresses and constant values. In addition, during the formation of a data processing message, a mechanism for applying the constant to the operation channel must also be provided. Finally, the presence or use of immediate arguments must not interfere with the acknowledgement mechanism. In the explanation to follow, two mechanisms for supporting immediate arguments will be described. The first, or single level scheme, shown in FIG. 13, uses additional drivers between the argument source field and the data bus. The second, or dual level scheme, shown in FIG. 14, employs additional logic to transfer immediate values from the address bus to the data bus.

Figure 13:
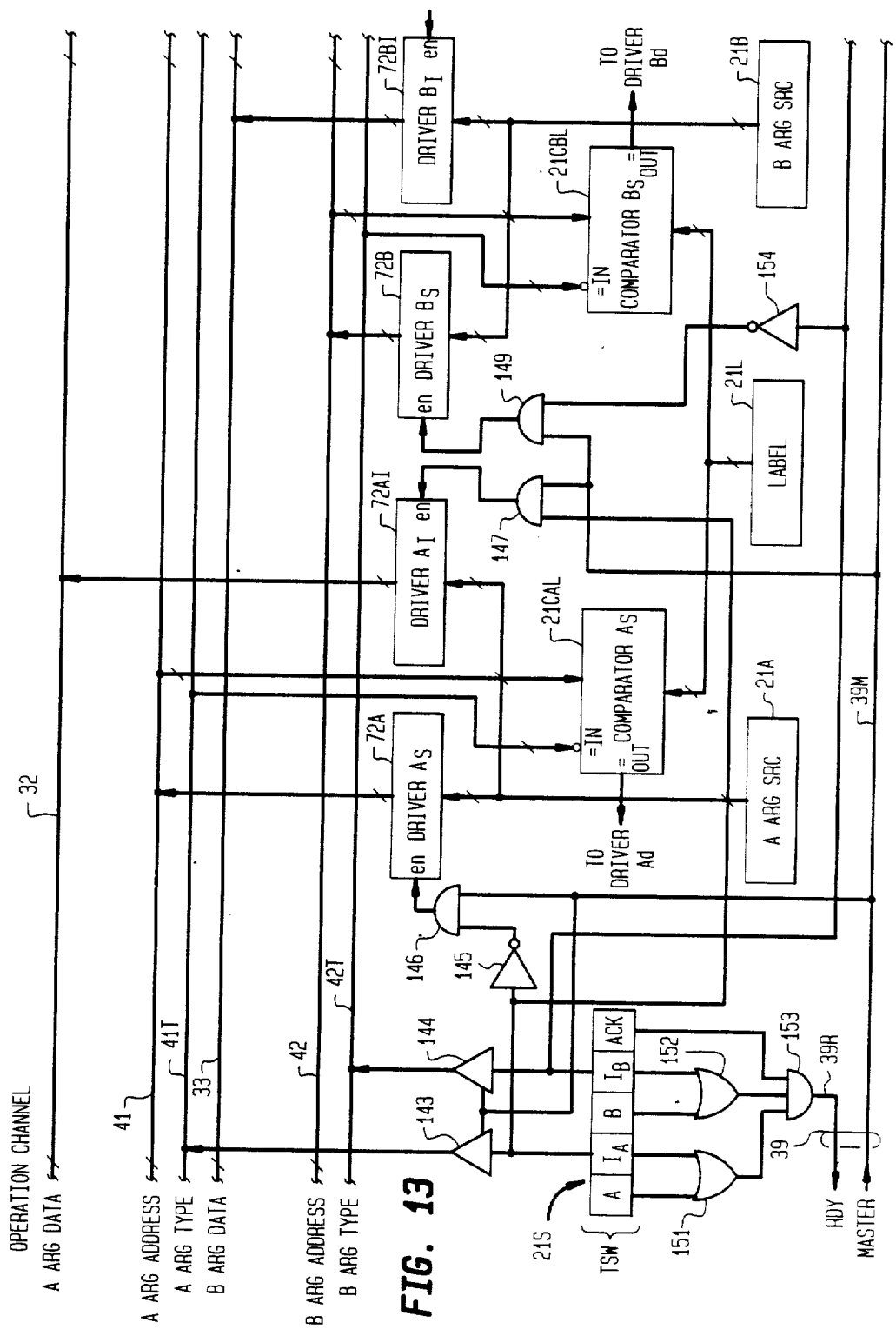
FIG. 13 diagrammatically shows a single level scheme, as a modification of the operand generation mechanism of FIG. 7, for supporting the use of immediate arguments.

Referring now to FIG. 13, there is shown a first modification of the operand generation mechanism described above with reference to FIG. 7, for supporting the use of immediate arguments. As shown in FIG. 13, the operation channel 15 is modified to include a pair of additional A and B argument type signal lines 41T and 42T to indicate whether or not the arguments are immediate. These argument type signals (A Arg Type and B Arg Type) are asserted by the master template. If none of these lines is active, its associated argument is immediate rather that requiring direct addressing to an argument source field. Each of links 41T and 42T is coupled to (controllably) disable (in the case of an immediate argument) a respective template address (label) comparator 21CAL, 21CBL that is monitoring its associated address bus, so as to prevent any template, other than the master template, from applying an argument value to a data bus.

A pair of additional drivers 72AI and 72BI are coupled to the respective A and B argument source entries 21A and 21B, for controllably asserting the immediate arguments directly onto the data buses. These drivers are controllably enabled by a pair of AND gates 147 and 148 which monitor a pair of status flag bits Ia and Ib that are incorporated into the template status word 21S. These additional bits are active (logical 1) when the A or B argument source fields 21A or 21B contain immediate arguments. Gates 147 and 148 are controlled by the active template designator (FIG. 12) asserting an active signal on master line 39M. Otherwise, if immediate flag bits Ia, Ib are not set, then via inverters 145, 154 and AND gates 146 and 149, drivers 72A and 72B are controllably enabled by the assertion of an active signal on master line 39M.

The use of the additional immediate flag bits within the status word field also affects the manner in which the RDY signal is generated. In addition to requiring the setting of the acknowledgement flag Ack, indicating that all dependent templates have been asserted, either the A or B availability flag is set, or the Ia or Ib flags are set indicating that the argument is immediate and its value is resident in the corresponding argument source field 21A, 21B. Logical circuitry for producing the RDY signal in the case of an expanded status word field to include immediate arguments includes OR gates 151, 152 and AND gate 153, as shown.

In addition to being coupled to disable comparators 21CAL, 21CBL, argument type signal lines 41T and 42T are coupled to controllably disable comparators 21CAR-A, 21CBR-A and 21CAR-B, 21CBR-B of FIG. 10, to prevent the assertion of false acknowledgement signals on the Ack A and Ack B lines.

Figure 14:
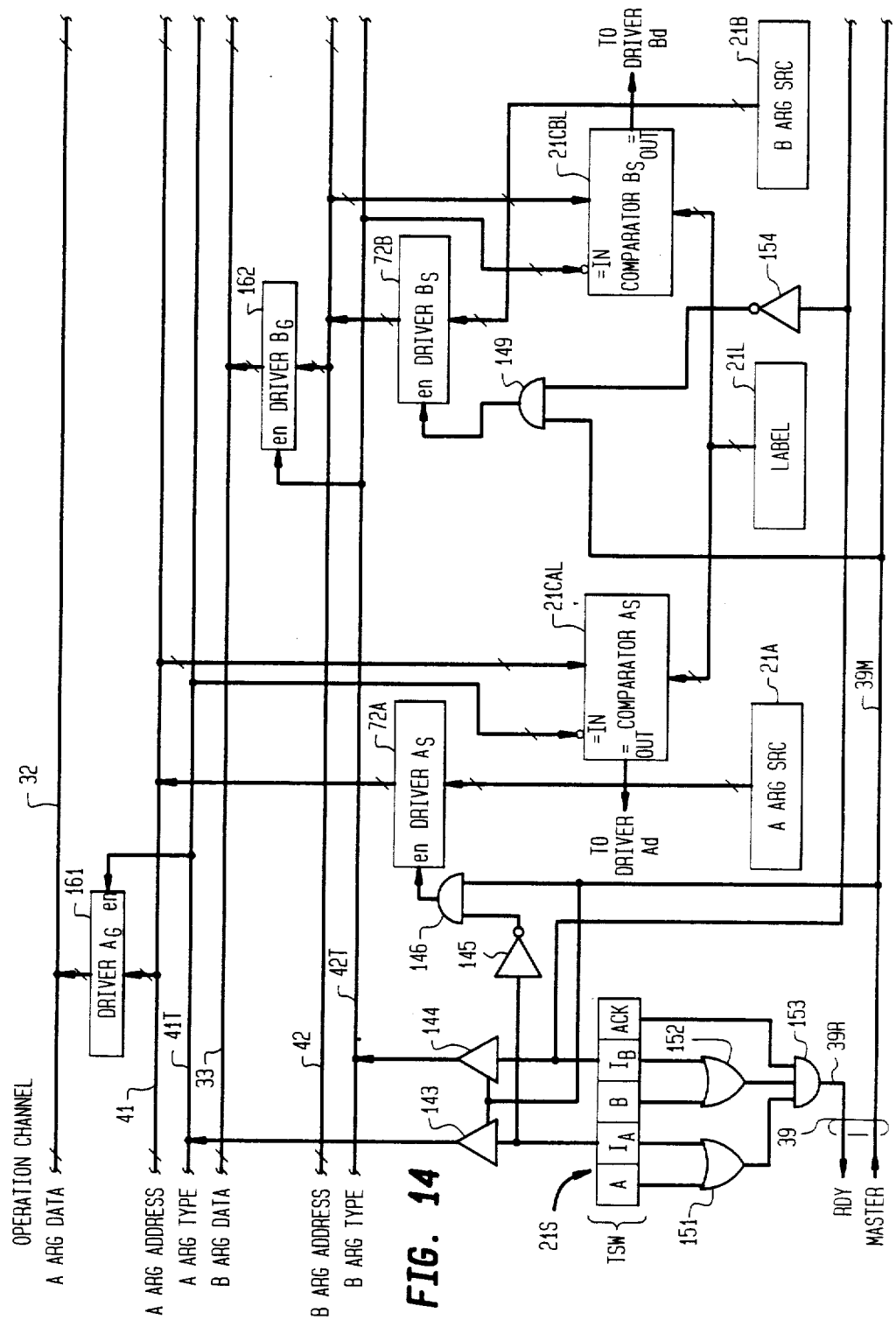
FIG. 14 shows a dual level modification of the operand generation mechanism of FIG. 7, for handling both direct addressing and immediate type arguments.

FIG. 14 shows a second, or dual level, modification of the operand generation mechanism of FIG. 7, for handling both direct addressing and immediate type arguments, again using the A and B argument type lines 41T and 42T, shown in FIG. 13, but with reduced logic complexity. As shown in FIG. 14, a pair of additional A and B drivers 161 and 162 are coupled between the respective A and B address and A and B data buses. These additional drivers are controllably enabled directly by the respective A and B type lines. In the configuration of FIG. 14, when the Ia flag is set, the value is applied to the A Arg Address bus; however, driver 161 is enabled, so as to assert the immediate value onto the A data bus 32. Similarly, when the Ib flag is set, the value is applied to the B Arg Address bus; however, driver 162 is enabled, so as to assert the immediate value onto the B data bus 33.

The data processing operations of the associative communications architecture thus far described involve the use of fixed operators. In a practical system, however, function execution will involve conditional operators for flow control and decision making. In the discussion to follow, the manner in which the architecture described supra is modified to handle conditional operators, termed 'switch' and 'select', will be addressed.

Switch Template

Figure 15:
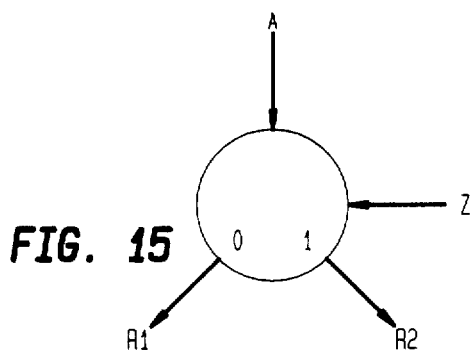
FIG. 15 diagrammatically shows a switch template for initiating the execution of a data processing operation in which a primary data operand is made available to one of two sets of prescribed recipient templates depending on the value of a control Boolean operand.

A switch template, diagrammatically shown in FIG. 15, initiates the execution of a data processing operation in which a primary data operand A is made available to one of two sets of prescribed recipient templates (0,1) depending on the value of a control Boolean operand B. Any dependent template's argument source entry will reference only one of the two result values. Namely, the value returned is always the template's A argument, with the named result to which the value is returned being defined by the Boolean value of the template's B argument. If the Boolean operand value is false (logical 0), the A operand value will be returned to the first result, designated <switch label>0.0, where <switch label> is the contents of the switch template's label address field. Similarly, if the B operand is true (logical 1), the value of the A operand will be returned to the <switch label>0.1 result. Because each template that is dependent upon the switch template last acquired the most recent of a pair of values referenced by it, a switch template is inhibited from executing until all of its dependent templates, for both result values, have been executed.

Figure 16:
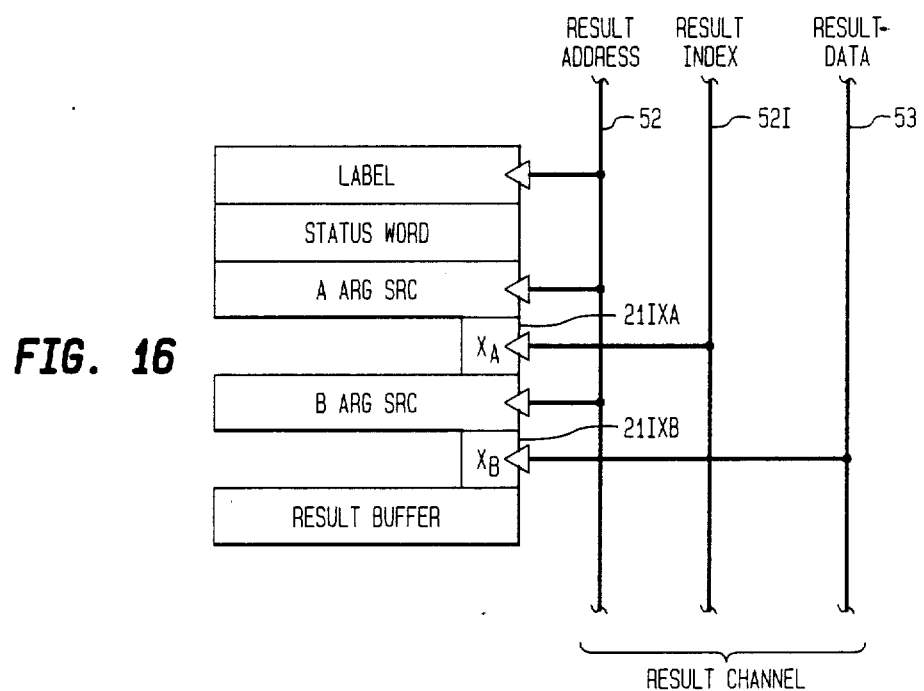
FIG. 16 illustrates a switch template.

The mechanism of a switch template, shown in FIG. 16, involves a minor modification of the basic template data structure shown in FIG. 2, specifically the addition of a result index line 52IX to the result channel, which is coupled to a result index bit (21IXA, 21IXB) that is appended to the result address to identify to which of the two result elements the returned value is directed. Generally, the result index will be a logical 0, referencing the first result element R0 of the template (since most templates have only single element results); for the infrequent case in which the second result element R1 is referenced, the result index is a logical 1.

Figure 17:
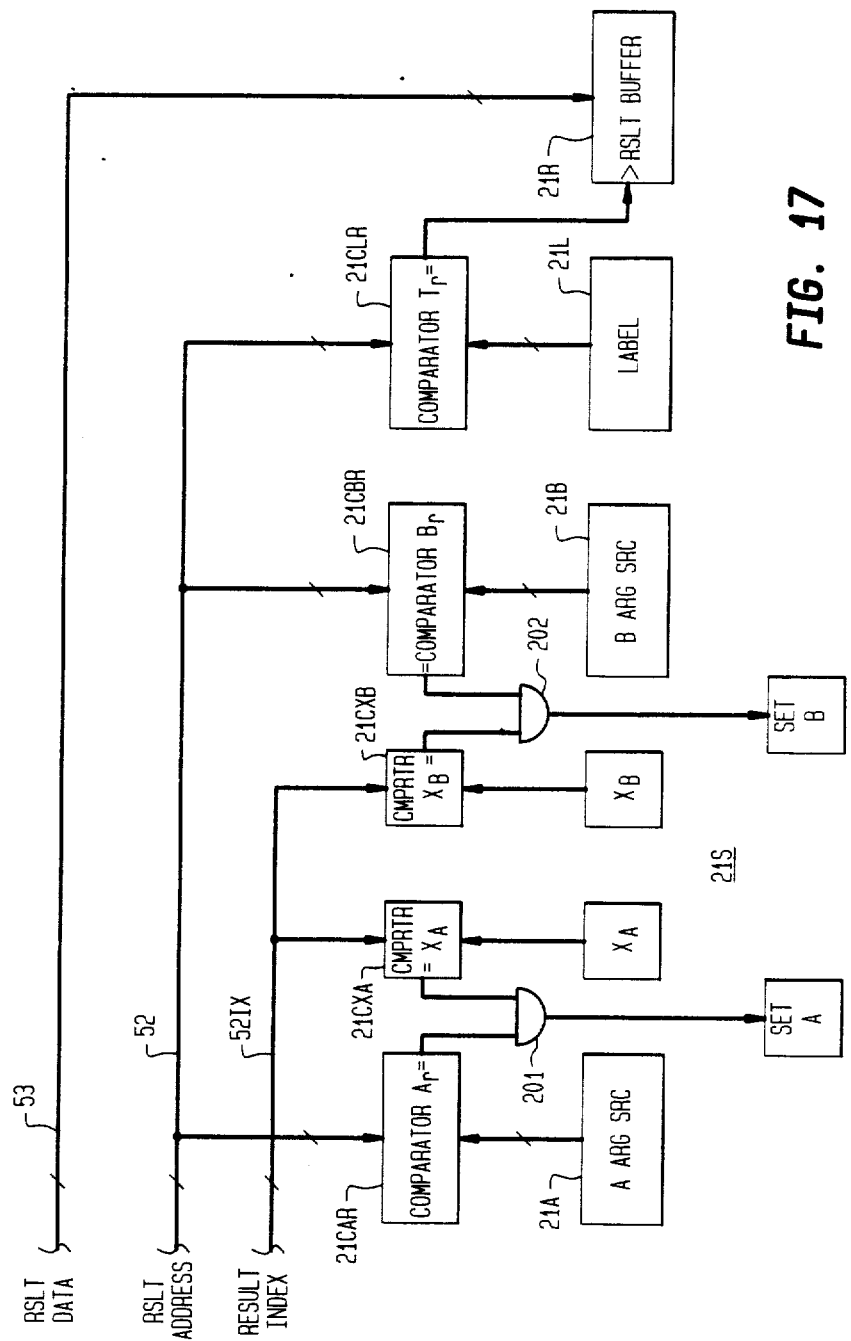
FIG. 17 illustrates the configuration of modified signal processing hardware within the template necessary to support a switch function.

The configuration of the modified signal processing hardware within the template necessary to support a switch function is illustrated in FIG. 17 as comprising comparators 21CXA, 21CXB which are coupled to compare the appended A and B index bits of the template status word field 21S with the contents of the result index line 52IX. The output of comparator 21CXA is logically ANDed with the output of comparator 21CAR in AND gate 201; the output of comparator 21CXB is logically ANDed with the output of comparator 21CBR in AND gate 202. For a template's A operand, comparator 21CAR compares its contents with the result address, as described previously, while comparator 21CXA compares the bit on the result index line 52I with the A index bit of the status word field. Only if both compare operations are true does the template recognize the presence of its A operand and updates its A availability bit. A similar operation is carried out with respect to the B operand, using its dedicated comparator logic.

It should be noted that there is no need to specify which of the two result elements from a switch template is required by a master template argument since there is only one available at a time from a given switch and the current master template has already determined that the one available is the one that it requires. Moreover, since all dependent templates of a switch template must have used its previous results before it can be asserted, the distributed acknowledgement mechanism described supra need not distinguish between templates accessing result element R0 and those accessing result element R1, so that it requires no modification in order to support a switch template.

The assertion of a switch template proceeds in the same manner as a normal dyadic operator, placing its address (label), opcode and A and B argument source entries onto the operation channel 15. Functional computation unit 13 returns the contents of the A data bus 32 to result data bus 53, the label to result address bus 52 and the appended (least significant) bit of the contents of the B data bus 33 to result index line 52IX. Dependent template then determine whether or not they are able to use the result in accordance with the value of the index bit and the contents of their own extension bits, as explained above.

Select Template

Figure 18:
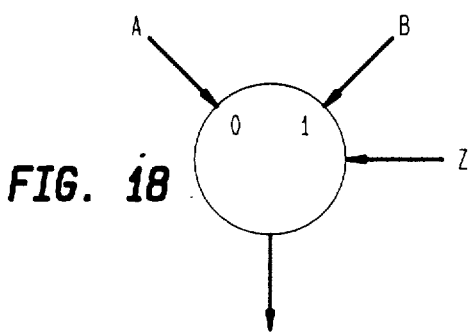
FIG. 18 diagrammatically illustrates a select template for initiating the execution of a data processing operation in which one of its two data operands is made available, depending on the value of a third, control Boolean operand.
Figure 19:
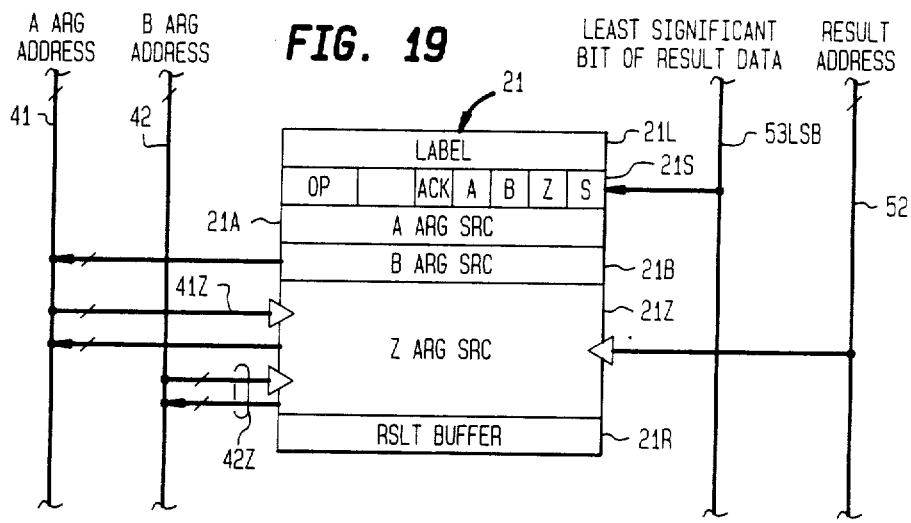
FIG. 19 illustrates a select template.

A select template, diagrammatically shown in FIG. 18, and the mechanism for the execution of which is shown in FIG. 19, initiates the execution of a data processing operation in which one of its two data operands A and B is made available, depending on the value of a third, control Boolean operand Z. In order to be asserted, the control operand Z and the selected argument (A or B) are required. To accommodate the additional Z operand, the data structure is modified to include a Z argument source field 21Z and to add a corresponding Z argument available bit Z into the status word field 21S. In addition, the least significant bit (S) of the result data is latched as part of the template status word, so that the template can hold the Boolean value of the Z argument and can determine which of its A and B arguments is to be applied to the A argument address bus of the operation channel when the select template becomes a master template.

Figure 20:
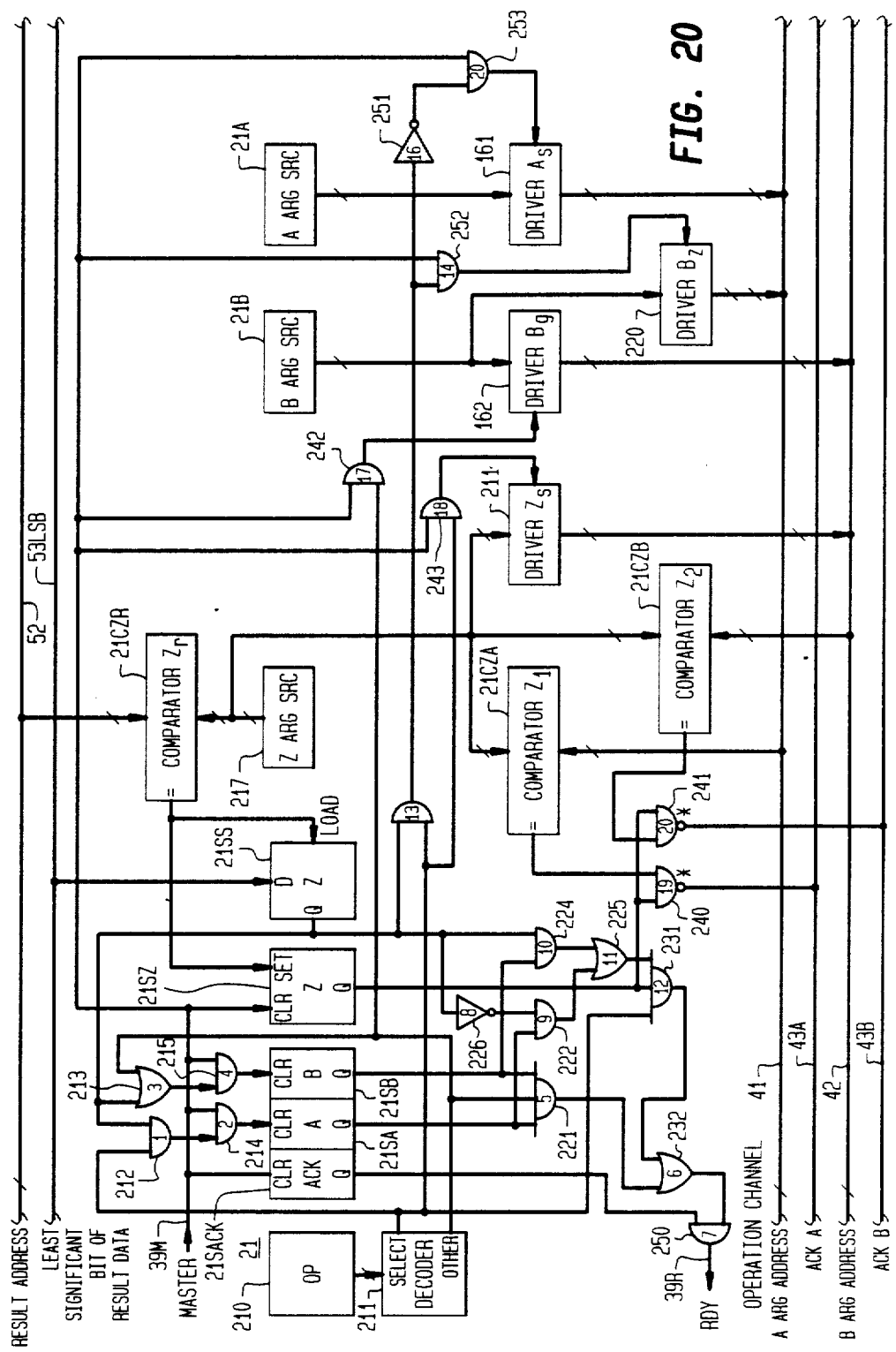
FIG. 20 shows signal processing logic for enabling a template to perform the select function.

The signal processing logic for enabling the template data structure to perform the select function is shown in detail in FIG. 20 as comprising a first Z comparator 21CZR which compares the entry in the Z argument source field 21Z with the contents of the result bus 52, a second Z comparator 21CZA which compares the Z argument with the contents of the A argument address bus 43A and a third Z comparator 21CZB which compares the Z argument with the contents of the B argument address bus. The output of comparator 21CZR sets a Z available flip-flop 21SZ within the template status word 21S and loads an S flip-flop 21SS with the least significant bit 53LSB of the result data bus 53. The outputs of comparators 21CZA, 21CZB are coupled to NOR gates 240 and 241, respectively, which are controllably enabled by the Q output of Z latch 21SZ, which is further coupled to on input of AND gate 231. The Q output of S latch 21SS is coupled to NAND gate 212 and AND gates 223 and 224 and to OR gate 213. It is complemented by inverter 226 and applied to AND gate 222.

The opcode field 210 is coupled to a decoder 211 which provides a first "select" output to each of NAND gate 212 and AND gates 231, 223 and 243. A second "other" output of decoder 211 is coupled to OR gate 213 and to each of AND gates 221 and 242. The output of NAND gate 212 is coupled to one input of AND gate 214 a second input of which is coupled to master control line 39M, which serves as a clear or reset input for the contents of the template status word. Master control line 39M is further coupled to the clear inputs of acknowledgement latch 21SACK and Z latch 21SZ and to AND gates 215, 243, 252 and 253. A second input of And gate 252 is coupled to the output of AND gate 223, which is also complemented by inverter 251 and applied to a second input of AND gate 253.

The output of AND gate 253 is applied to the enable input of driver 161, while the output of ANd gate 242 is coupled to the enable input of driver 162. A pair of additional drivers 211 and 220 are coupled to Z argument source field 21Z and B argument source field 21B, respectively. The output of driver 211, which is enabled by the output of ANd gate 243, is coupled to B argument address bus 42. The output of driver 220, which is enabled by the output of AND gate 252, is coupled to A argument address bus 41.

Logic circuitry for generating a RDY indication to the template designator 38 over line 39R includes AND gate 250, a first input of which is coupled to the Q output of Acknowledgement latch 21SACK, and a second input of which is coupled to OR gate 232. OR gate 232 is coupled to the outputs of each of AND gates 221 and 231. AND gate 221 receives the Q outputs of the A and B available latches 21SA and 21SB and the other output of decoder 211. The Q output of A available latch is also coupled to AND gate 222, while the Q output of B available latch is coupled to AND gate 224. The outputs of AND gates 222 and 224 are coupled via OR gate to AND gate 231.

In operation, opcode decoder 211 examines the contents of the opcode field and determines if the template is to operate as a select template (asserting its 'select' output bit) or if the template is another type (asserting its 'other' output bit). If the template is not a 'select' template, then gates 221,232 and 250 cause a RDY signal to be place on line 39R, when the A and B and ACK latches 21SA, 21SB, 21SACK are set (A and B arguments available and acknowledgement ACK flags in the status field are set.

On the other hand, if the opcode indicates that the template is a select template, the Z argument must be available; namely comparator 21CZR must have detected a match between the contents of the result bus and the Z argument source field 21ZZ, thereby setting latch 21SZ and enabling a second input of AND gate 231. The third input of AND gate 231 depends upon the value of the least significant bit S of the result data bus. If the bit is a 0, so that the Q output of latch is 0, AND gate 224 is disabled, while AND gate 222 receives a 1 on its input coupled to inverter 226. To be enables the second input of AND gate 222 must indicate that the A argument is available (A availability latch 21SA is set). Alternatively, if the least significant bit S is a 1, then the B argument must be available, to enable the second input to AND gate 224.

As pointed out previously, when a template becomes a master template, it supplies operation data and reinitializes template status word 21S, which is ordinarily performed by clearing the A, B and ACK flags. For a select template, however, not all flags are necessarily reset. When a template becomes a master only the argument available flag of the argument that is actually used is cleared. Control logic for this purpose includes gates 212-215. The A available flag is cleared if the template is not a 'select' template or, of it is a 'select' template, if the value of the S bit is a 0. The B available flag is cleared if the template is not a 'select' template or, if it is a 'select' template, if the value of the S bit is a 1.

In the course of execution of a select template the Z argument and one of the A and B arguments are employed. For this purpose the Z argument is applied to the B argument address bus of the operation channel 15 via driver 211. If the S bit is a 0, then driver 161 is enabled via AND gate 253, and the contents of the A argument source field is asserted onto A argument address bus 41. Thus, the A and Z arguments are asserted and the B argument is saved for later use, as described above. If the S bit is a 1, on the other hand, then driver 162 is enabled via AND gate 242, and the contents of the B argument source field is asserted onto B argument address bus 42. The B and Z arguments are asserted and the A argument is saved for later use.

Distributed acknowledgements are extendable to the Z argument for the select template through the use of comparators 21CZA and 21CZB to compare the contents of Z argument field 21Z with the A and B argument addresses on buses 41 and 42, respectively, to thereby determine the select template's response on the acknowledgement buses 43A and 43B. Gates 240 and 241 assert active signals on buses 43A and 43B when either comparator detects a match and the Z bit is set, indicating that the template has not been asserted since its Z argument became available.

Figure 21:
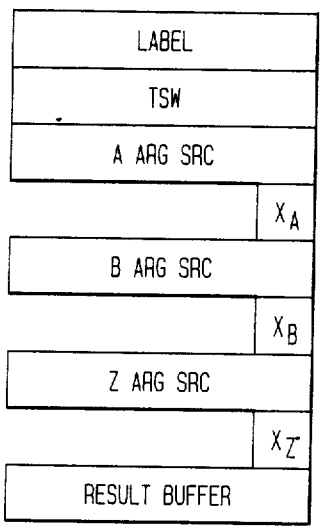
FIGS. 21 and 22 diagrammatically show expanded template fields and template word status entries.
Figure 22:
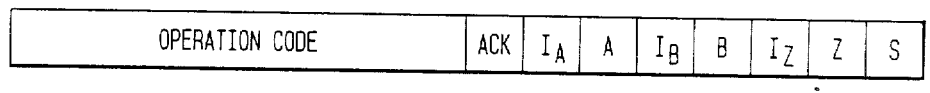
Figure 24:
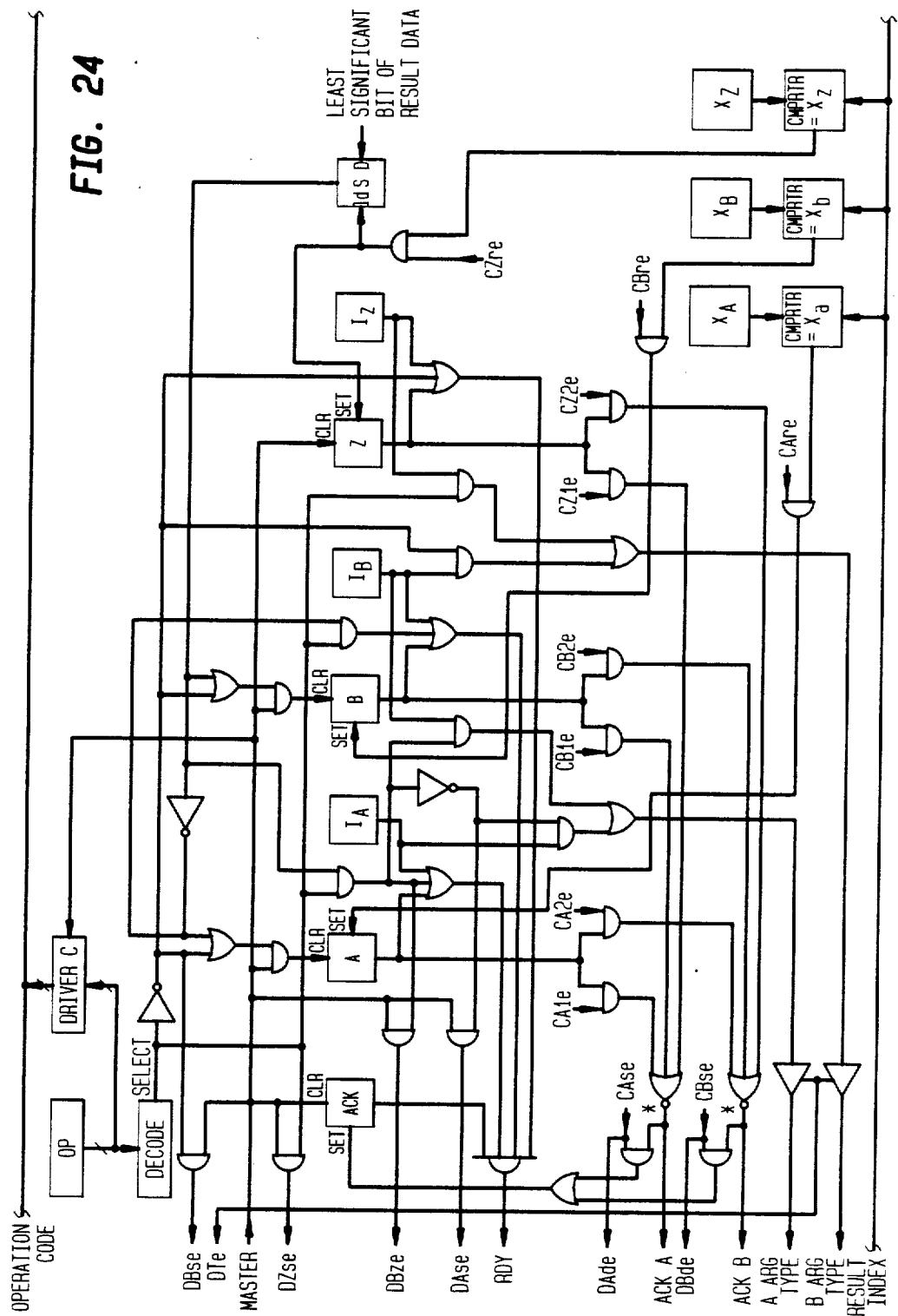

When all of the data structure and signal processing mechanisms described thus far are incorporated into a single template architecture, the expanded template fields and template word status entries may be diagrammatically represented by the data structures shown in FIGS. 21 and 22, respectively. The comparator and driver circuitry and their associated communication buses, together with the combined control logic therefore are depicted in FIGS. 23 and 24, respectively. To simplify the circuitry, operand decoder employs only a single output D to indicate that the template possesses select functionality. The ready signal RDY may be represented by the Boolean expression:

$$RDY \leftarrow -ACK^* [A + I_A + S^*D]^* [B + I_B + S^*D]^* [-Z + I_Z + D].$$

Note that the participation of immediate values for the Z argument, including $Z_X$ is shown by the logic of FIG. 24. When a select template becomes master, the values of the A and B argument type signal lines are defined in accordance with the value of the S bit of the status word field. $I_A$ or $I_B$ flags are asserted on A argument type line depending whether or not the template is a select template. If it is, whether the value of S is a 0 or a 1 is controlling. $I_A$ will be asserted on the B argument type line if the template is a select template; otherwise, $I_B$ will be asserted.

Multi-node Architecture

The associative template-based data processing mechanism described thus far is configured as a single, self-contained data processing station (or node), wherein all operands employed in the course of the execution of data processing messages and all execution results are exchanged between one template data storage facility and one functional computation unit. In a larger, system level architecture, comprised of multiple nodes, each having its own dedicated functional computation unit and template storage facility, wherein operand and result data are exchanged among the nodes of the system, the associative communication mechanism of the present invention may be extended to facilitate parallel computation throughput.

In the description to follow, for purposes of providing an illustrative example of a multiple node architecture, the system configuration will be considered to have a mesh topology, such as those illustrated in FIG. 25, in which each node is connected with and may communicate with three nearest neighbor nodes. For reference purposes, the exemplary node of interest will be identified as a south (S) node, having neighboring north (N), east (E) and west (W) nodes with which it shares data resources in the course of execution of its own data processing operations and also in the course of the execution of data processing operations by those neighboring nodes. Namely, within an individual node (e.g. a south node), a data processing operation defined by a template stored within that node is always executed by the functional computation unit within that node. However, the operands required for and the results of that execution may be shared by templates in nearest neighbor (north, east and west) nodes. In order to effect this sharing of data resources, the architecture of each node is configured to provide an inter-node associative communication capability, similar to that of an individual node, for those aspects of a template which may depend upon or be necessary for the execution of a template in any of its neighboring nodes, by assigning associative communication control functions to dedicated storage and supervisory units within each node.

Figure 27:
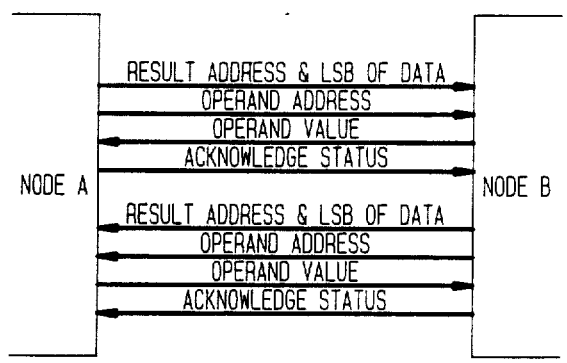
FIG. 27 shows the bus structure of an inter-node communications link.

More particularly, as diagrammatically illustrated in FIG. 26, the architecture of an individual node (S) includes a multinode communications channel interface 301 containing inter-node communication links 303 that extend to its three neighboring nodes (N, E, W) and through which data resources are shared. An individual inter-node link is shown in FIG. 27 as containing an operand address segment OA, an operand value segment OV, a result segment R and an acknowledge segment A.

The operand address segment OA conveys the address of the template in which the operand is to be obtained, while the operand value segment OV conveys the actual operand value to be used in the execution of a data processing operation by the functional computation unit within the node to which the operand value is transmitted. The result segment R conveys the result address and an indication of the availability of the result of a data processing operation executed by the functional computation unit of one node to each of its nearest neighbor nodes. The acknowledge segment A conveys acknowledge information consisting of the acknowledge condition state and is used to set the acknowledge flags of a selected template.

Within the node (S) itself, each of operand address segments OAE, OAW and OAN from neighboring nodes E, W and N and an internal operand address link OAS from a program execution coordinator 304 (to be described below with reference to FIG. 30) within which the data flow graph topology of that node is stored, is coupled to a data store 305 (to be described below with reference to FIG. 28). Data store 305 stores operands to be employed in the execution of data processing operations by templates contained within that node and templates of its neighboring nodes. It also stores acknowledgement information that is made available to the program execution coordinator 304 over link 306.

Within data store 305, operand addresses conveyed by local operand address link OAS and internode links OAE, OAW and OAN are employed to access operand values stored in an operand memory within the data store 305; accessed values are coupled links OVE, OVW, OVN, OVS to an operation packet builder 313 (to be described below with reference to FIG. 29), which essentially comprises a set of temporary holding registers in which the various component parts of a data processing message, intended for transmission over an internal execution message link 312 to a local functional computation unit 314, are assembled.

The results of instruction execution by functional computation unit 314 are coupled over an internal result communications channel RS to data store 305, program execution coordinator 304 and over respective portions RE, RW and RN of result segment R to the program execution coordinators in neighboring nodes E, W and N. The result value is stored in the operand memory within the data store 305, while the result address and the Z (least significant result value) bit are applied over result address segment R.

The opcodes of the instructions to be executed within the local node (S) are stored (in terms of template address) in an opcode store (memory) 321. In response to a template (opcode) address coupled onto link 325 by program execution coordinator 304, opcode store 321 couples the opcode over link 323 to operation packet builder 313, wherein data processing messages are assembled, as noted above. Operation packet builder 313 is also coupled (over link 325) to receive the template address from program execution coordinator 304, in order to identify the template originating the data processing execution request. As noted above, the operand values of data processing messages that are assembled by operation packet builder 313 are coupled over inter-node operand value links OVE, OVW and OVN (from neighboring nodes E, W and N) and local operand value link OVS from data store 305.

Figure 28:
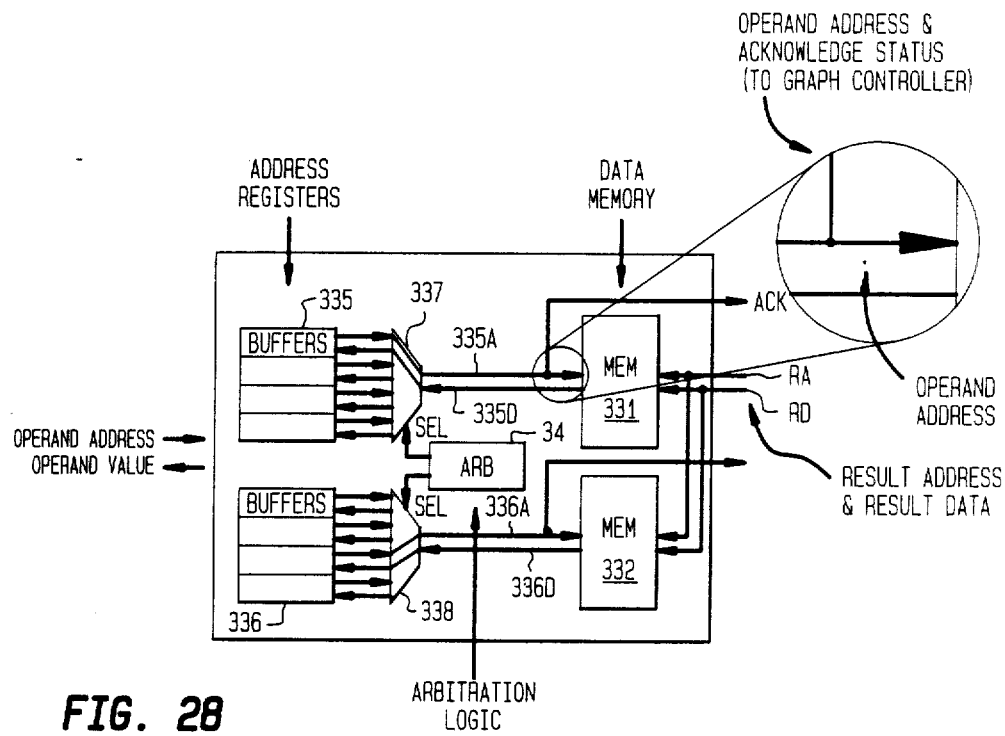
FIG. 28 diagrammatically illustrates the configuration of a data store.

Data Store (FIG. 28)

Data store 305 contains a pair of dual-port operand (result value) data memories 331 and 332, in which operands (result values) are stored for use by any of the four interconnected (E, W, N, S) nodes. The use of a pair of redundant data memories (and attendant access control circuitry) allows two operands to be resolved simultaneously, thereby increasing the availability of operand data. Specifically, each of the two memories performs a read and a write in the same cycle. Thus, the functional computation unit writes into its node's operand memory which two read addresses are being served.

The writing of result values into memories 331 and 332 occurs as a result of operation of the local functional computation unit, with the result value being coupled over result data input link RD and the template address being coupled over link RA, to identify that location in each of the data memories in which the result value is to be stored.

The reading of operand data values out of memories 331 and 332 and the handling of acknowledgements is effected through respective sets of buffer registers 335 and 336 and associated multiplexers 337 and 338 under the supervision of an arbitration logic circuit 341.

More particularly, each of buffers register sets 335 and 336 contains four data and address register units 351E, 351W, 351N, 351S and 352E, 351W, 351N, 351S, respectively, coupling operand address links OAE, OAW, OAN, OAS and operand value links OVE, OVW, OVN, OVS with data store operand data links 355D, 356D and data store operand address links 355A, 356A, through which operand values stored within data memories 331 and 332 are accessed. Each data and address register unit contains a pair of registers, one for storing operand data that is read out from memory and another for storing acknowledgement status information to be forwarded to the program execution coordinator and an operand address for accessing the operand value that is to be read out of memory and coupled to the operation packet builder of the requesting node.

Which operand address link will be serviced is handled by multiplexers 337 and 338 under control of an arbitration logic circuit 341, which is preferably implemented as a round-robin arbitration circuit to ensure that no requesting link will be locked out. Whenever the contents of an operand address register are coupled over one of links 355A, 356A to access an operand from one of data memories 351,352 the associated acknowledgement status information is coupled over link 306 to program execution coordinator 304.

Figure 29:
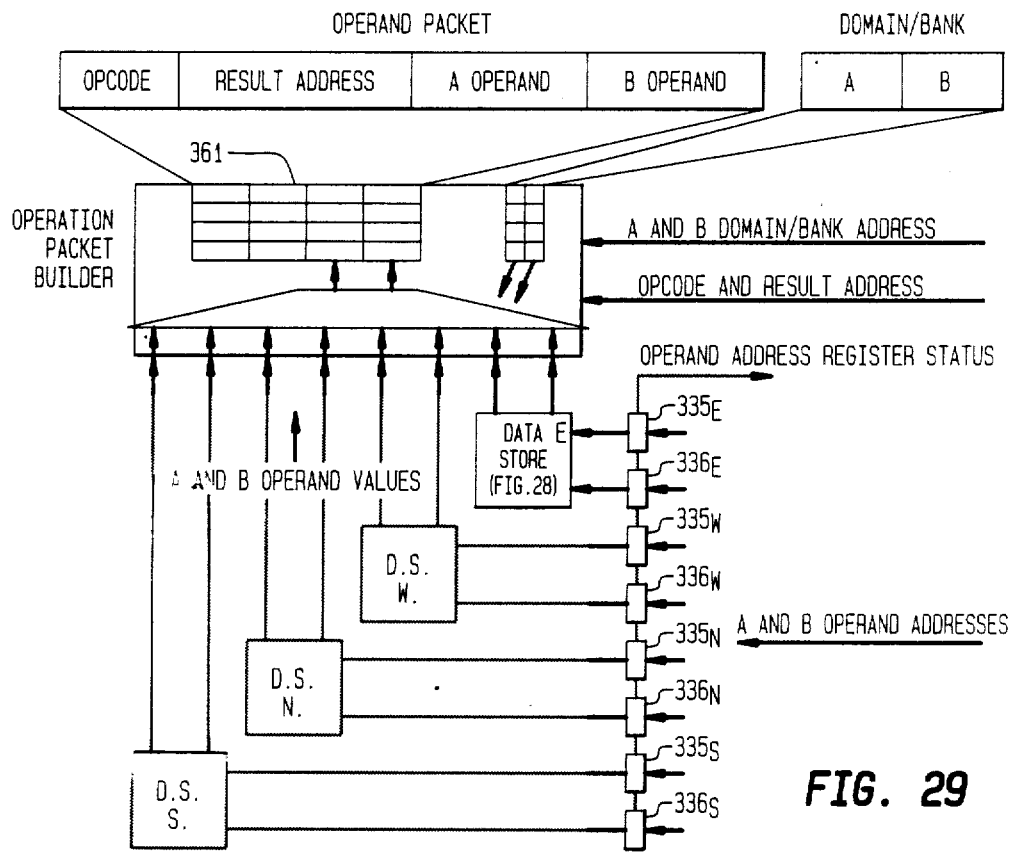
FIG. 29 shows the configuration of an operation packet builder.

Operation Packet Builder (FIG. 29)

As noted previously, the operation packet builder 313 assembles data processing operation message packets for delivery to functional computation unit 314. For this purpose, the packet builder is coupled to receive an opcode from opcode store 321, a result address from data store 305 and, for each operand, an additional neighbor interface address which specifies a neighbor node and from which of the memories of the data store an operand is to be accessed. Because the delay between the initiation of the execution of a data processing operation and the arrival of an operand can vary, and because there are multiple (four in the present example) sources of operand values, throughput can be enhanced by preparing, concurrently, a plurality of template data processing messages. To accommodate multiple template messages, the operation packet builder is essentially configured as a set of buffers in which opcode and result addresses are temporarily stored, while operands are being fetched from the data store. Once the operand data values have been obtained from the data store, the assembled message packet is transmitted to the functional computation unit.

The buffer circuitry of which operation packet builder 313 is configured is diagrammatically shown in FIG. 29 as a first set of four packet registers 361, 362, 363 and 364. Each register encompasses a packet field that contains the opcode, result (originating template) address, the A operand and the B operand. Associated with the first register set is a second register set, containing four neighbor/data memory registers 371, 372, 373 and 374. Each of the registers of the second set stores three bits, for designating in which of the four nodes the operand value is stored and which of the data memories (331 or 332) of that operand value-storing node contains the operand. Once an operand value (A operand or B operand) has been accessed from the data store 305 and stored in the operand field of the designated packet register, the contents of the address register within the data store that had been storing operand address is cleared, so that it may be used by another template. Whether or not an operand address register has been cleared so that it may receive a new operand address is indicated to a dispatcher logic unit within program execution coordinator 304 be described below with reference to FIG. dl.

Figure 30:
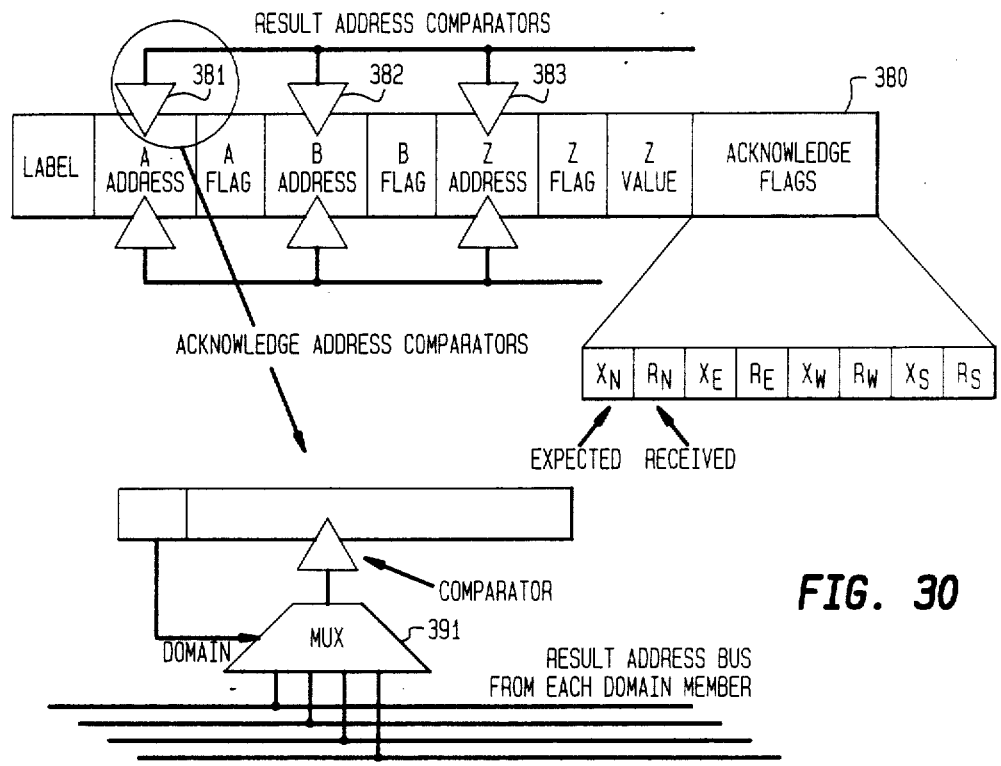
FIG. 30 diagrammatically illustrates the respective fields of an individual template stored within the program execution coordinator and the mechanism through which the program execution coordinator monitors the result address link from its local node and those of neighbor nodes for setting the A, B and Z flags; is generated.

Proqram Execution Coordinator (Representative Template Shown in FIG. 30)

As noted previously, the program execution coordinator stores data flow program execution topology, maintains the program control state and determines the order in which program templates are asserted. In addition, it receives acknowledge synchronization signals from the program execution coordinators of neighboring nodes indicating whether or not any of their templates still require the availability of an operand that is associated with a template to be executed in that node. Finally, the program execution coordinator monitors the result link from the functional computation units in each of its neighboring nodes in order to synchronize the operation of the node with the completion of operations in other nodes and to update its control state.

For this purpose, the program execution coordinator is comprised of memory for storing each field of the templates of that node, except for the result values (which are retained in the data store, as explained supra), the opcodes and (condition determination) comparator logic, coupled with the respective fields of the templates, for monitoring, in substantially the same manner as a single node architecture described above, the result and acknowledge signal communication links of the local and neighboring nodes.

Result Bus Comparison

Referring now to FIG. 30 there are diagrammatically illustrated the respective fields of an individual one of the templates stored within the program execution coordinator and the mechanism through which the program execution coordinator monitors the result address link from its local node and those of neighbor nodes for setting the A, B and Z flags. Because of the static allocation of dataflow templates, the operand referenced by an operand address field can come from only one of the local node and the three neighboring nodes; it is not variable. As a consequence, it is necessary to monitor only one of the four result address buses, the identity of which is specifiable by the two most significant bits of the template address.

To this end, rather than provide respective A and B operand address and Z address comparators for each of the four result buses, each template utilizes only one comparator for each of the respective operand and Z address fields, with the input to the comparator being defined by a multiplexed connection to each bus. As shown in FIG. 30, respective comparators 381, 382 and 383 are coupled to compare the A operand, B operand and Z address values of a respective template 300 with the outputs of respective mutliplexers 391, 392 and 393. Each multiplexer has four inputs coupled to the result links of nodes E, W, N, S and a select input which is coupled to the two most significant bits of the template address, so as to designate which of the result links will be coupled to its associated comparator. The use of a multiplexer and comparator pair significantly reduces the hardware complexity (transistor count and power consumption) that would be encountered using a separate comparator for each bus.

Acknowledgement Handling

In the single node architecture, described above, acknowledgement signaling is essentially defined by two operations: 1-generating the acknowledge condition state; and 2-setting an acknowledge flag. Since, in a single node architecture all templates reside in the same node, both of these operations may be carried out at the same time. In a multinode architecture, however, a dependent template may be located in any one of four different nodes, the data processing operations within which are being carried out by independent functional computation units. Still, whenever a node creates an acknowledge condition signal, that signal needs to go to only the node to which the operand data request is directed. All templates in one node that use the results of a template in another node monitor each other to determine whether every template in that node is finished with the operand of interest. When the operand is no longer required by any template in that node an acknowledge condition signal is generated.

Figure 31:
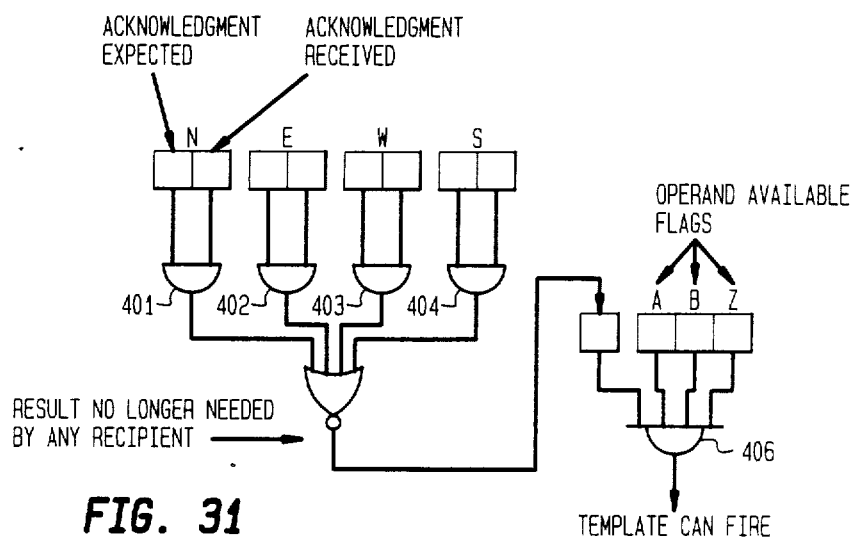
FIG. 31 illustrates circuitry for handling acknowledgements.

The handling of acknowledgements is effected by expanding the template acknowledgement field (shown in FIG. 30) and logically operating on a set of four acknowledge flags and associated mask bits that make up the expanded field, using the circuitry shown in FIG. 31. As shown in FIG. 30 the expanded acknowledge field includes a masking 'expected' bit X, which is set if an acknowledgement is still expected, and a 'received' bit R, which indicates that an expected acknowledgement has in fact been received, for each of the four nodes. For each of the nodes E, W, N, S, a respective one of AND gates 410, 402, 404, 404 is coupled to the X and R bits and has its output coupled to NOR gate 405. If there are no templates within a neighboring node that require the use of a template in the local node then no acknowledgement is expected and the X bit is not set. If this mask bit has been set, then upon a change in state of the acknowledge 'received' bit R, the output of its associated AND gate will change state, thereby applying a 0 to that node's input to NOR gate 405. Upon the acknowledgements for all four nodes having been satisfied, the output of NOR gate changes state to one bit, thereby asserting a one on its input to template-ready AND gate 406. Other inputs of AND gate 406 are coupled to receive the A, B and Z flags of the template 380. Upon each of the flags (A and B operand, Z bit and Acknowledge) being set, the output of AND gate 406 changes state, indicating that the template may be asserted.

Template Execution

Figure 32:
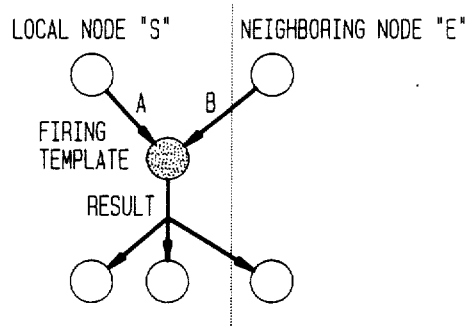
FIG. 32 diagrammatically illustrates a multi-node data flow operation.

The execution of a template in the multi-node architecture proceeds as follows. Again, considering the local node of interest to be the south node S, let it be assumed that the A operand is to be obtained from the local node and its B operand from neighboring node E; in addition, the result values are used by two local (node S) recipient templates and one neighboring (node E) template, as diagrammatically illustrated in FIG. 32.

An execution cycle begins with the template being in condition to be asserted to its local functional computation unit. The program execution coordinator dispatching logic, described above with reference to FIG. 31, selects the pending template for execution when a communication port to the local data store $305_S$ (which contains the A operand) and a similar port to the data store $305_E$ in the east node E containing the B operand are available and transmits the address of the pending template to the opcode store 321 and to operation packet builder $313_S$. The contents of the A and B operand address fields with the program execution coordinator $313_S$ are asserted onto the A and B operand buses; the A operand address is applied to the available access port of data store $305_S$ and the B operand address is applied to the available access port of data store $305_E$ in neighboring node E.

As explained above, for each of the operand fetches an acknowledgement condition state signal is generated; the other templates in local node S monitor the operation channel 301 and if either of their A and B operand fields matches either of the A and B operand addresses that have been asserted onto the operation channel, these templates assert an active signal on the wired-OR acknowledge signal line, indicating that these templates still require that operand to be available. Otherwise, their respective acknowledge lines are not asserted active. As pointed out above, the states of these lines tell the source template whether or not there are other templates in the local node S for which that operand must remain available.

Once the pending template has been selected for execution, operation packet builder 313 selects an available buffer and stores the identity of the data store ports that are to supply the A and B operands. The identity of the asserting template is stored in the result field and applies its address to the opcode store 321, so that the opcode associated with that template is read out of the opcode store and loaded in the opcode field in the packet builder buffer.

As described previously, the data store arbitration logic is preferably implemented as a round-robin mechanism. Consequently, within neighboring node E from which the B operand is to be accessed, each of the address buffers is examined. When the port for the asserted template is accessed, the data memory reads the contents of its addressed value and returns it to the dedicated output buffer of the local node, which supplies the operand directly to the packet builder. At the same time, the acknowledge condition state that accompanies the operand address is coupled over link 306 to the program execution coordinator. The address selects the operand source template and the acknowledge condition state is loaded into the acknowledge flag associated with local node S.

When the contents of each of the fields of the requesting template's buffer within the operation packet builder 313 have been filled, the buffer's ready flag is set (the output of AND gate 406 is enabled). The functional computation unit detects the assertion of the ready flag on the operation channel and acquires the contents of the data processing message within the buffer.

After processing the instruction, functional computation unit 314 places the result value and the address of the asserted template on the result channels to each of the nodes. The result value is stored in each of the redundant pair of data memories 351, 352 within the data store $305_S$ of the local node S and the result address is distributed over the result bus to the program execution coordinators of each of the four nodes E, W, N, S.

Within each of these nodes, the result address comparators of each template monitor the result buses of the nodes from which their operands are derived. The A operand comparator of the source template in local node S monitors the local result bus. When the operand source templates are asserted, each comparator determines the availability of the result value by detecting a match between the contents of its operand address field and the result address bus. In response to a match, the corresponding A or B flag is set.

Thereafter, as other templates, which are dependent upon the results of the local template's execution, are asserted they access the data memory in local node S to obtain its result value and they return acknowledge condition state signals to the acknowledge ports of the program execution coordinator. When a dependent template in neighboring node E is asserted, there are no other templates using local node S's result value as operands, so that the acknowledge condition state that is returned to the local program execution coordinator causes the corresponding acknowledge condition flag to be set. When the first of the two dependent templates in node S is asserted, the acknowledge flag will not be set since the second dependent template has yet to be asserted and still requires the result value to be available. Once the second template is asserted, however, the acknowledge flag in node S is set (there are no other templates in node S requiring the result value to remain available for their use).

With both the neighboring node template and the local node's two operations completed, both the A and B flags are now set, indicating that both operands are available. The acknowledge flag in local node S and that associated with the neighbor node E containing the dependent template are set; also, the masks (X) bits of the remaining two acknowledge flags (for nodes W and N) are set since these nodes contain no templates that are dependent on the template of interest in node S. As a consequence, each of AND gates 401–404 provides an enable input to ready AND gate 406 (FIG. 32), so that its output changes state indicating that the template is ready to be asserted again.

As will be appreciated from the foregoing description, the present invention provides a computer architecture which significantly reduces the substantial temporal overhead and memory bandwidth requirements of token-based static data flow computer architectures by replacing token-based processor communications with associative processing, similar to that used for associative memories, through which plural data execution control structures, or templates, of the system are interconnected with one another and with the data processing resources of the system, so that they may monitor and respond to operations carried out with respect to all other components of the system simultaneously, thereby increasing data processing execution speed and enhancing the efficient use of system memory.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A data processing system comprising:
   first means for controllably executing a data processing operation on data supplied thereto;
   second means for controlling the supply of data to be processed by said first means and including means for storing a plurality of data processing execution control structures, each respective one of said data processing execution control structures containing first information representative of the identification of that data processing execution control structure, second information representative of a data processing operation to be performed by said first means, third information representative of data to be processed by said first means, fourth information representative of the status of a data processing execution cycle, and fifth information representative of the result of a data processing operation carried out by said first means;
   a first communications channel for coupling data and control messages from said second means to said first means; and
   a second communications channel for coupling the results of a data processing operation carried out by said first means to said second means; and wherein
   each of said plurality of data processing execution control structures stored by said second means is associatively coupled with and simultaneously and continuously monitors said first and second communications channels, and said second means includes means for asserting onto said first communications channel a data processing control message containing first and second information derived from a selected data processing execution control structure requesting the execution of a data processing operation by said first means, and third information derived from fifth information stored within prescribed ones of said plurality of data processing execution control structures; and wherein
   said first means includes means for asserting onto said second communications channel a data processing output message containing the identification of said selected data processing execution control structure and the result of the data processing operation carried out in accordance with the second and third information asserted onto said first communications channel.

2. A data processing system comprising:
   a functional computation unit in which data processing operations are executed on operand data in accordance with an opcode supplied thereto, so as to produce output data representative of the result of the execution of a data processing operation;
   a storage unit in which are stored a plurality of data processing execution control structures each of which comprises a plurality of entries including an address for identifying that data processing execution control structure, an opcode for defining a data processing operation to be performed by said functional computation unit, a plurality of operand source addresses for specifying the addresses of data processing execution control structures containing operands to be employed in the execution of said defined data processing operation, the status of said data processing execution control structure with respect to its associated data processing operation and a result entry in which the output data produced by said functional computation unit as a result of its execution of a data processing operation requested by that data processing execution control structure is stores;

a first communications channel, coupled between said storage unit and said functional computation unit, and being monitored simultaneously by each of the data processing execution control structures of said storage unit, for conveying data processing request messages from said storage unit to said functional computation unit;

a second communications channel, coupled between said functional computation unit and said storage unit, and being monitored simultaneously by each of the data processing execution control structures of said storage unit, for conveying output data from said functional computation unit to said storage unit; and a control unit, coupled with said storage unit, for controllably causing a data processing message to be asserted onto said first communication channel in accordance with the contents of a selected one of said data processing execution control structures, said data processing message including the contents of the address and opcode entries of said selected data processing execution control structure and operands specified in accordance with the operand source address entries of said selected data processing execution control structure, and for causing output data, produced by said functional computation unit as a result of a data processing operation executed in accordance with said data processing message and asserted onto said second communications channel by said functional computation unit, to be captured in the result entry of said selected data processing structure.

3. A data processing system according to claim 2, wherein a respective data processing execution control structure includes means for monitoring said first communications channel and asserting the contents of its result entry onto said first communications channel in response to recognizing its address having been asserted thereon, so that said result may be employed as an operand for the execution of a data processing operation by said functional computation unit.

4. A data processing system according to claim 3, wherein the status entry of a respective data processing execution control structure includes acknowledgement information representative of whether any other data processing execution control structure of said storage unit requires the use of the contents of the result entry of said respective data processing execution control structure as an operand.

5. A data processing system according to claim 4, wherein the status entry of a respective data processing execution control structure includes operand availability information representative of whether the result entry of another data processing execution control structure, whose address is defined by the contents of a source address entry of said respective data processing execution control structure, contains an operand required for the execution of a data processing operation defined in accordance with opcode entry of said respective data processing execution control structure.

6. A data processing system according to claim 5, wherein a respective data processing execution control structure further includes means for indicating the readiness of said data processing execution control structure to have a data processing message asserted on said first communications channel in accordance with the contents of said status entry.

7. A data processing system according to claim 6, wherein said indicating means includes for indicating the readiness of said data processing execution control structure to have a data processing message asserted on said first communications channel in response to said acknowledgement information being representative that no other data processing execution control structure of said storage unit requires the use of the contents of the result entry of said respective data processing execution control structure as an operand, and that said operand availability information is representative that all operands required for the execution of a data processing operation defined in accordance with opcode entry of said respective data processing execution control structure are available.

8. A data processing system according to claim 7, wherein said control unit includes means for clearing the contents of the acknowledgement and operand availability information within the status entry of said respective data processing execution control structure in the course of causing a data processing message associated with said respective data processing execution control structure to be asserted onto said first communications channel.

9. A data processing system according to claim 2, wherein the status entry of a respective data processing execution control structure includes operand availability information representative of whether the result entry of another data processing execution control structure, whose address is defined by the contents of a source address entry of said respective data processing execution control structure, contains an operand required for the execution of a data processing operation defined in accordance with opcode entry of said respective data processing execution control structure.

10. A data processing system according to claim 9, wherein said second communications channel includes a data portion over which said output data is conveyed and a result address portion over which the address of an output data recipient data processing execution control structure is conveyed, and wherein a respective data processing execution control structure includes means for comparing its operand source address entries with the contents of the address portion of said second communications channel and causing said operand availability information of said status entry to indicate that an operand entry required for the execution of a data processing operation defined in accordance with an opcode entry of said respective data processing execution control structure is available in the result entry of another data processing execution control structure whose address matches one of the operand source address entries of said respective data processing execution control structure.

11. A data processing system according to claim 10, wherein said second communications channel further includes a result index portion for identifying one of the operand source entries of a data processing execution control structure and said comparing means includes means for causing said operand availability information of said status entry to indicate that an operand entry required for the execution of a data processing operation defined in accordance with an opcode entry of said respective data processing execution control structure is available in the result entry of another data processing execution control structure whose address matches the operand source address entry of said respective data processing execution control structure as identified by said result index portion.

12. A data processing system according to claim 2, wherein a data processing execution control structure further includes means for controllably enabling the contents of an operand source address entry to be directly asserted as an operand for the execution of said defined data processing operation.

13. A data processing system according to claim 2, wherein said first communications channel includes a data portion over which operands are conveyed, an address portion over which the address of a selected data processing execution control structure is conveyed and an opcode portion over which the opcode entry of a selected data processing execution control structure is conveyed, and further including an intra data processing execution control structure address link over which operand source addresses are conveyable among the data processing execution control structures of said storage unit, and wherein a respective data processing execution control structure includes means for comparing its address with the contents of said intra data processing execution control structure address link and causing the contents of its result entry to be asserted onto said data portion of said first communications channel, in response to detecting a match between its address and the contents of said intra data processing execution control structure address link.

14. A data processing system according to claim 13, wherein a respective data processing execution control structure includes means for controllably asserting its operand source addresses onto said intra data processing execution control structure address link in the course of the assertion of a data processing message, and wherein said second communications channel includes a data portion over which said output data is conveyed and a result address portion over which the address of an output data recipient data processing execution control structure is conveyed, and wherein a respective data processing execution control structure includes means for controllably causing said operand address asserting means to assert an operand source address onto said intra data processing execution control structure address link in accordance with the contents of the address portion of said second communications channel.

15. A data processing system according to claim 14, wherein said controllably causing means includes means for controllably causing said operand address asserting means to assert a selected operand source address onto said intra data processing execution control structure address link in accordance with the contents of a prescribed portion of the data portion of said second communications channel.

16. A data processing system comprising:
first means for controllably executing a data processing operation on data supplied thereto;
second means for controlling the supply of data to be processed by said first means and including means for storing a plurality of data processing execution control structures, each respective one of said data processing execution control structures containing first information representative of the identification of that data processing execution control structure, second information representative of a data processing operation to be performed by said first means, third information representative of data to be processed by said first means, fourth information representative of the status of a data processing execution cycle, and fifth information representative of the result of a data processing operation carried out by said first means;
a first communications channel for coupling data and control messages from said second means to said first means; and
a second communications channel for coupling the results of a data processing operation carried out by said first means to said second means; and wherein
each of said plurality of data processing execution control structures stored by said second means is associatively coupled with and simultaneously and continuously monitors said first and second communications channels for the presence of said first information having been asserted thereon and, in response to detecting the presence of its identification, controllably interfaces prescribed information associated with the execution of a data processing operation, and said second means includes means for asserting onto said first communications channel a data processing control message containing first and second information derived from a selected data processing execution control structure requesting the execution of a data processing operation by said first means, and third information derived from fifth information stored within prescribed ones of said plurality of data processing execution control structures; and wherein
said first means includes means for asserting onto said second communications channel a data processing output message containing the identification of said selected data processing execution control structure and the result of the data processing operation carried out in accordance with the second and third information asserted onto said first communications channel.

17. A data processing system comprising:
a plurality of data processing nodes each of which includes
a functional computation unit in which data processing operations are executed on operand data in accordance with an opcode supplied thereto, so as to produce output data representative of the result of the execution of a data processing operation,
a program execution control unit which contains a plurality of data processing execution control structures, each of which data processing execution control structures comprises a plurality of entries including an address for identifying that data processing execution control structure, a plurality of operand source entries for specifying the addresses of operands to be employed in the execution of a data processing operation associated with that data processing execution control structure, and the status of said data processing execution control structure with respect to its associated data processing operation,
opcode storage means, coupled to said program execution control unit, for storing a plurality of opcodes respectively associated with said plurality of data processing execution control structures, a respective opcode defining a data processing operation to be performed by said functional computation unit, operand storage means, coupled to said program execution control unit, for storing a plurality of result entries in which output data produced by said functional computation unit as a result of its execution of a data processing operation requested by a data processing execution control structure is stored, data processing message assembly means, coupled to said program execution control unit, said opcode storage means and said operand storage means, for assembling a plurality of data processing messages to be forwarded to said functional computation unit for execution, a respective data processing message including the identification of a respective data processing execution control structure, the contents of respective result entries identified by operand source addresses of said respective data processing execution control structure, and the opcode associated with said respective data processing execution control structure, and a first communications channel, coupled between said data processing message assembly means and said functional computation unit, and being monitored simultaneously by each of the data processing execution control structures of said program execution control unit, for conveying data processing request messages from said data processing message assembly means to said functional computation unit, a second communications channel, coupled between said functional computation unit, said program execution control unit storage unit and said operand storage means, and being monitored simultaneously by each of the data processing execution control structures of said program execution control unit, for conveying output data from said functional computation unit to said operand storage means and the identification of the data processing execution control structure for which a data processing request message has been processed by said functional computation unit to said program execution control unit;

first internode communication channel means, coupled to the second communication channel of each of said plurality of nodes, for simultaneously coupling the identification of the data processing execution control structure for which a data processing request message has been processed by its associated functional computation unit to the program execution control unit in each of said nodes; and second internode communication channel means, coupled to the operand storage means, data processing message assembly means and program execution control means of each of said nodes, for enabling the operand addresses of a data processing execution control structure stored within the program execution control unit of a node to be simultaneously presented to the operand storage means of each of every other node, and for enabling operand value stored in any node to be simultaneously presented to the data processing message assembly means of any node.

18. A data processing system according to claim 17, wherein the status entry of a respective data processing execution control structure includes operand availability information representative of whether the result entry of another data processing execution control structure in any of said plurality of nodes, whose address is defined by the contents of a source address entry of said respective data processing execution control structure, contains an operand required for the execution of a data processing operation defined in accordance with opcode entry of said respective data processing execution control structure.

19. A data processing system according to claim 18, wherein, within each node, said second communications channel includes a data portion over which output data from said functional computation unit is conveyed and a result address portion over which the address of said respective data processing execution control structure is conveyed, and said program execution control unit includes means for comparing the operand source entries of said respective data processing execution control structure with the contents of the address portion of said second communications channel and causing said operand availability information of said status entry to indicate that an operand required for the execution of a data processing operation defined in accordance with an opcode associated with said respective data processing execution control structure is available in the operand storage means of that one of said nodes which contains the data processing execution control structure whose identification matches one of the operand source address entries of said respective data processing execution control structure.

20. A data processing system according to claim 19, wherein said second communications channel further includes a result index portion for identifying one of the operand entries of a data processing execution control structure and said comparing means includes means for causing said operand availability information of said status entry to indicate that an operand entry required for the execution of a data processing operation defined in accordance with an opcode entry of said respective data processing execution control structure is available in the operand storage means of a node containing the data processing execution control structure whose address matches the operand source address entry of said respective data processing execution control structure as identified by said result index portion.

21. A data processing system according to claim 17, wherein, with a node, said operand storage means includes means for monitoring said first internode communications channel means and asserting thereon the contents of an operand entry, in response to recognizing the address of a data processing execution control structure contained within the program execution control unit of that node having been asserted on said first internode communications channel means, so that said operand entry may be employed as an operand for the execution of a data processing operation by a functional computation unit in one of said nodes.

22. A data processing system according to claim 21, wherein the status entry of a respective data processing execution control structure contained within the program execution control unit of a node includes acknowledgement information representative of whether another data processing execution control structure of any of said nodes requires the use of the operand contained within the operand storage means of said node whose address corresponds to identity of said respective data processing execution control structure.

23. A data processing system according to claim 22, wherein the status entry of said respective data processing execution control structure includes operand availability information representative of whether the operand storage means of any node has an address, which is defined by a source address entry of said respective data processing execution control structure and contains an operand required for the execution of a data processing operation, defined in accordance the opcode associated with said respective data processing execution control structure.

24. A data processing system according to claim 23, wherein the program execution control unit of a node includes means for indicating the readiness of said respective data processing execution control structure to have a data processing message asserted on said first communications channel in accordance with the contents of said status entry.

25. A data processing system according to claim 24, wherein said indicating means includes for indicating the readiness of said respective data processing execution control structure to have a data processing message asserted on said first communications channel, in response to said acknowledgement information being representative that no other data processing execution control structure in any of said plurality of nodes requires the use of the contents of a storage location of the operand storage means of said node, the address of which storage location is the identity of said respective data processing execution control structure and that said operand availability information is representative that all operands required for the execution of a data processing operation defined in accordance with the opcode of said respective data processing execution control structure are available.

* * * * *